(12) United States Patent
Fujisawa

(10) Patent No.: US 8,896,554 B2
(45) Date of Patent: Nov. 25, 2014

(54) DATA RETRIEVAL APPARATUS AND DATA RETRIEVAL METHOD

(75) Inventor: Eizo Fujisawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 169 days.

(21) Appl. No.: 13/387,451

(22) PCT Filed: Jul. 29, 2010

(86) PCT No.: PCT/JP2010/062858
§ 371 (c)(1),
(2), (4) Date: Jan. 27, 2012

(87) PCT Pub. No.: WO2011/013782
PCT Pub. Date: Feb. 3, 2011

(65) Prior Publication Data
US 2012/0127108 A1    May 24, 2012

(30) Foreign Application Priority Data
Jul. 29, 2009   (JP) ................................ 2009-176232

(51) Int. Cl.
G06F 3/041    (2006.01)
G06F 17/30    (2006.01)
G06F 1/16    (2006.01)
G06F 3/0346    (2013.01)
G06F 3/0488    (2013.01)

(52) U.S. Cl.
CPC ........ *G06F 17/30017* (2013.01); *G06F 1/1694* (2013.01); *G06F 3/0346* (2013.01); *G06F 3/0488* (2013.01)

USPC .......................................................... 345/173

(58) Field of Classification Search
None
See application file for complete search history.

(56) References Cited

U.S. PATENT DOCUMENTS

2006/0200769 A1*   9/2006   Chevallier et al. ............ 715/727
2008/0229222 A1    9/2008   Kake

FOREIGN PATENT DOCUMENTS

| JP | 2002149616 A | 5/2002 |
| JP | 2003345492 A | 12/2003 |
| JP | 2008234055 A | 10/2008 |
| JP | 2009061161 A | 3/2009 |

OTHER PUBLICATIONS

International Search Report and Written opinion for PCT/JP2010/062858 dated Sep. 7, 2010.

* cited by examiner

*Primary Examiner* — Joseph Haley
(74) *Attorney, Agent, or Firm* — Lowe Hauptman & Ham, LLP

(57) ABSTRACT

According to an aspect, a data retrieval apparatus includes a display unit, a detector, and a control unit. The display unit displays a group including a plurality of data on a display screen. Each of data is associated with a relevance ratio to search criteria. The detector detects movement of the group on the display screen. The control unit calculates a rate according to a degree of the movement of the group detected by the detector, and extracts the data from the group based on a comparison between the calculated rate and the relevance ratio.

9 Claims, 17 Drawing Sheets

DATA RETRIEVAL APPARATUS AND DATA RETRIEVAL METHOD

CROSS-REFERENCE TO RELATED APPLICATION

This application is a National Stage of PCT international application Ser. No. PCT/JP2010/062858 filed on Jul. 29, 2010, and which is based upon and claims the benefit of priority from Japanese Patent Application No. 2009-176232, filed on Jul. 29, 2009.

FIELD

The present invention relates to a data retrieval apparatus and a data retrieval method for retrieving data.

BACKGROUND

A communication device such as a mobile phone is provided with a device for inputting an instruction of an operator. For example, Patent Literature 1 discloses a mobile terminal for detecting an inclined angle of the mobile terminal and a change of its state with an action such as "shaking" and "inclining", as an input of the instruction. The device described in Patent Literature 1 is configured to control a movement of an icon group representing information contents through the inclined angle of the mobile terminal and to display momentarily moving icons on a display.

CITATION LIST

Patent Literature

Patent Literature 1: Japanese Patent Application Laid-open No. 2002-149616

Technical Problem

When search refinement of data is to be performed, the communication device checks search criteria being a key against information for each of the data and extracts data that meets the search criteria.

There is a need for a data retrieval apparatus and a data retrieval method that allow a user to extract desired data with high operability.

SUMMARY

According to an aspect, a data retrieval apparatus includes a display unit for displaying a plurality of data, as a group, each with which relevance ratio to search criteria is different from others on a display screen; a detector for detecting movement of the group, displayed by the display unit, on the display screen; and a control unit for extracting the data with the relevance ratio according to a degree of the movement of the group detected by the detector from the group.

According to another aspect, the detector is a touch panel for detecting an input instruction input by touching an area where the group is displayed on the display unit.

According to another aspect, the control unit determines a range of relevance ratios being criteria for extracting the data based on the degree of movement of the group, and extracts data with the relevance ratio which is within the range.

According to another aspect, when the degree of the movement of the group is relatively high, the control unit extracts data with the relevance ratio which is relatively high.

According to another aspect, the control unit causes data with the low relevance ratio which to be displayed in an area separated from the group and, based on the degree of the movement of the group.

According to another aspect, the control unit displays a new group including the data separated from the group.

According to another aspect, the control unit determines whether the data is extracted from the group based on a display trajectory of the group according to the movement of the group detected by the detector.

According to another aspect, when it is determined that the display trajectory of the group represents reciprocation, the control unit causes the data with the relevance ratio which is relatively low to be separated from the group.

According to another aspect, the detector detects a moving speed or a moving distance of the group on the display screen, as the degree of movement of the group.

According to another aspect, a data retrieval apparatus includes a housing; a display unit for displaying a plurality of data, as a group, each with which relevance ratio to search criteria is different from others; a detection sensor for detecting an acceleration or a moving state of the housing; and a control unit for extracting the data with the relevance ratio according to the detected acceleration or the detected moving state from the group.

According to another aspect, a data retrieval method includes displaying a plurality of data, as a group, each with which relevance ratio to search criteria is different from others on a display screen; detecting movement of the displayed group on the display screen; and extracting the data with the relevance ratio according to a degree of the movement detected at the step of detecting from the group.

Advantageous Effects of Invention

The data retrieval apparatus and the data retrieval method according to the present invention allow user-friendly retrieval.

DESCRIPTION OF EMBODIMENTS

The present invention will be explained in detail below with reference to the drawings. It should be noted that the present invention is not limited by the following explanation. In addition, the components in the explanation below include those which are easily thought of by persons skilled in the art, those substantially equivalents, and those in a scope of so-called equivalents. In the following, a mobile communication apparatus as a data retrieval apparatus, more specifically, a mobile phone is used as an example to be explained, however, a target to which the present invention is applied is not limited to the mobile phones The present invention can also be applied to, for example, PHSs (Personal Handyphone Systems), PDAs, portable and car-mounted navigation devices, portable personal computers, and game devices.

First Embodiment

Figure 1:
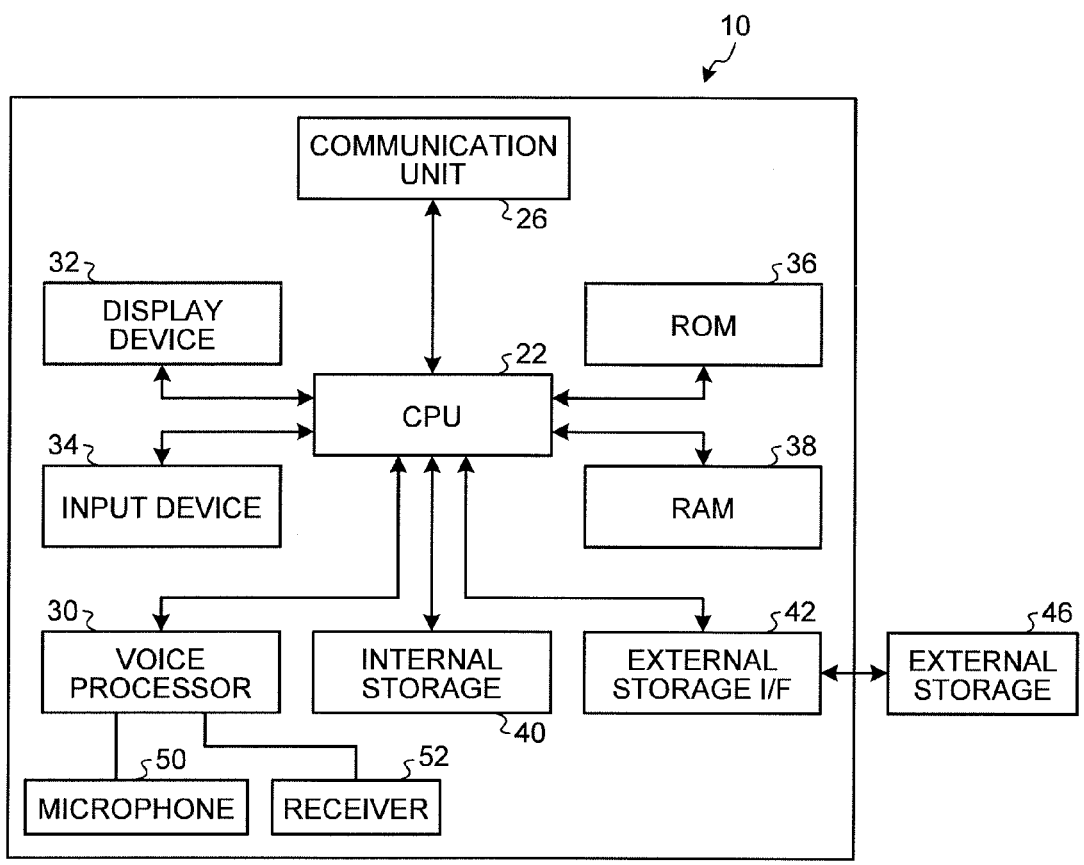
FIG. 1 is a block diagram illustrating a schematic configuration of a first embodiment of a mobile communication apparatus of the present invention.

FIG. 1 is a block diagram illustrating a schematic configuration of a first embodiment of the data retrieval apparatus according to the present invention. In the present embodiment, the present invention is applied to the mobile communication apparatus. As illustrated in FIG. 1, a mobile communication apparatus 10 basically includes a CPU (Central Processing Unit) 22, a communication unit 26, a voice processor 30, a display device 32, an input device 34, ROM 36, RAM 38, an internal storage 40, and an external storage interface (I/F) 42. The mobile communication apparatus 10 is connected to an external storage 46 via the external storage I/F 42. The mobile communication apparatus 10 also includes, in addition to the components, various components, which are provided in mobile communication apparatuses, such as an imaging unit and various terminals. An outer shape of the mobile communication apparatus 10 may be any of various shapes such as a foldable shape configured with two members coupled to each other by a hinge, a shape in which two members are slid each other, and a one box shape.

The CPU 22 is a processor that integrally controls the entire operation of the mobile communication apparatus 10. That is, the CPU 22 controls the operations of the communication unit 26, the display device 32, and the like so as to execute various processes of the mobile communication apparatus 10 in an appropriate procedure according to the operation of the input device 34 and the software stored in the ROM 36 and the internal storage 40 of the mobile communication apparatus 10. The various processes of the mobile communication apparatus 10 are, for example, voice phone conversation over a line switching network, composition and transmission/reception of e-mail, and browsing of Web (World Wide Web) sites on the Internet. The operations of the communication unit 26, the voice processor 30, the display device 32, and the like are, for example, transmission/reception of signals by the communication unit 26, voice input/output by the voice processor 30, and image display by the display device 32.

The CPU 22 executes the processes based on program(s) (for example, operating system program and application programs) stored in the ROM 36 and the internal storage 40. The CPU 22 is formed with, for example, MPU (Micro Processing Unit) and executes the various processes of the mobile communication apparatus 10 according to the procedure instructed by the software. That is, the CPU 22 sequentially reads operation codes from the operating system program and the application programs or the like stored in the ROM 36 and the internal storage 40 to perform the processes.

The CPU 22 has a function of executing a plurality of application programs. The application program executed by the CPU 22 includes a plurality of application programs such as an image-display application program for displaying an image on the display device 32, an operation-detection application program for calculating the operation input based on the input detected by the input device 34, a search application program for performing screening search (explained in detail later), an Internet application program for performing Internet communication, a mail application program for composing a mail, and a phone application program for making a phone call.

The communication unit 26 establishes a wireless signal path using CDMA system or so with a base station via a channel allocated by the base station, and performs telephone communication and information communication with the base station.

The voice processor 30 executes processes of a voice signal input to the microphone 50 and a voice signal output from the receiver 52.

The display device 32 is provided with a display panel such as LCD (Liquid Crystal Display) or an organic EL (Organic Electro-Luminescence) panel, and displays a video according to video data and an image according to image data supplied from the CPU 22 on the display panel.

The input device 34 is a touch panel placed on the front face of the display device 32, and, when the operator touches the surface thereof, detects the touch as an input. The input device 34 detects a touched position, the strength of the touch, and the like. As the touch panel, there can be used touch panels of various types such as a matrix switch, a resistive type, a surface acoustic wave type, an infrared type, an electromagnetic induction type, and a capacitive type. When an image of keys allocated with various types of functions such as a power key, a talk key, numeric keys, character keys, direction keys, a decision key, and a send key is displayed on the display device 32 and if the input device 34 is pressed by the operator, the input device 34 detects a pressed position (touched position). The CPU 22 of the mobile communication apparatus 10 determines an input of a key operation corresponding to the position where the input device 34 detects the touch, and performs a corresponding process.

The ROM (Read Only Memory) 36 is a read-only storage device which stores therein farm ware such as BIOS used for the drive of the mobile communication apparatus 10. The RAM (Random Access Memory) 38 is a readable and writable storage device, which is formed with, for example, SRAM (Static Random Access Memory) and DRAM (Dynamic Random Access Memory). A main storage device is formed with the ROM 36 and the RAM 38. The ROM 36 and the RAM 38 are allocated with a computer program and temporary data, by the CPU 22, used in the processing process of the software, and temporarily store the allocated data in respective work areas thereof.

The internal storage (internal memory) 40 is a readable and writable storage device, for example, EEPROM (flash memory, etc.) and a hard disk provided in the mobile communication apparatus 10. The internal storage 40 is used as an auxiliary storage device, which stores therein software and data used for processes performed by the CPU 22. The internal storage 40 includes, in addition to the software, an image folder for storing therein image data obtained through communication or downloaded, a standby image folder, and a like, for storing therein an image file used for a standby image. The internal storage 40 also stores therein, in addition to these data, for example, voice data obtained through communication or downloaded, software used by the CPU 22 for controlling the internal storage 40, address book for storing and managing telephone numbers, mail addresses, and the like of other parties in communication, a audio file such as a dial tone and a ring tone, and temporary data used in the processing process of the software.

The external storage I/F 42 is a terminal connected to the external storage 46 that is removable. By connecting the external storage I/F 42 and the external storage 46, data transmission and reception can be performed between the CPU 22 and the external storage 46. The external storage (external memory) 46 is a storage device removably attached to the mobile communication apparatus 10 through the external storage I/F 42, and can be formed with a memory card such as an SD card (registered trademark) and CompactFlash (registered trademark), and a removable HDD (Hard Disk Drive). As a combination of the external storage I/F 42 and the external storage 46, a removable disk drive may be combined with a removable disk.

Figure 2:
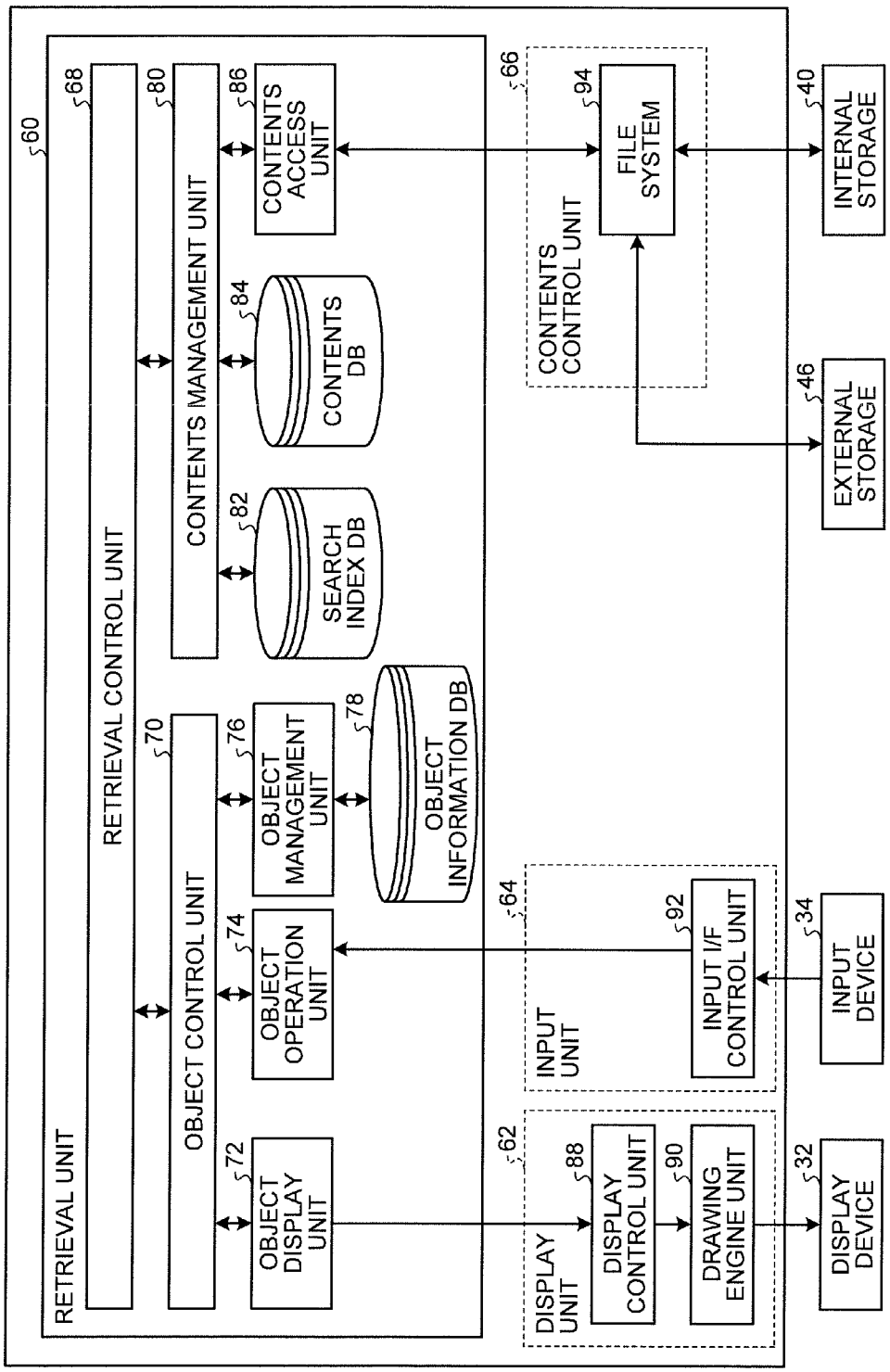
FIG. 2 is a block diagram illustrating a schematic configuration of software of the mobile communication apparatus in FIG. 1.

Next, the configuration of software of the mobile communication apparatus 10 will be explained below with reference to FIG. 2. FIG. 2 is a block diagram illustrating a schematic configuration of the software of the mobile communication apparatus 10. FIG. 2 represents as if units of software (application programs) are discretely provided for simple explanation, however, signal exchange and data processing are performed between the CPU 22, the ROM 36, the RAM 38, the internal storage 40, and the like, which does not mean that the units are separately provided in a visual manner. In addition, FIG. 2 represents, as the software, software related to screening search of item objects and image display, however, the mobile communication apparatus 10 is provided with various types of software other than the software illustrated in FIG. 2. The object mentioned here represents an item as a target to be operated by the operator, and includes a group object (folder), an item object (file, data), and the like. The folder (directory) includes not only a folder created by the operator but also a folder created by the mobile communication apparatus 10 through screening search and a folder temporarily created to manage a group of files searched by screening search. As the file, image data, audio data, data for internet home pages, and address book for storing telephone numbers and mail addresses with their names, and a like are exemplified.

Referring to FIG. 2, the software of the mobile communication apparatus 10 includes a retrieval unit 60 for performing screening search, a display unit 62 for controlling an image to be displayed on the display device 32, an input unit 64 for detecting an input through the input device 34, and a contents control unit 66 for transmitting/receiving data to/from the internal storage 40 and the external storage 46. The configuration of each of the units will be explained below.

The retrieval unit 60 includes a retrieval control unit 68, an object control unit 70, an object display unit 72, an object operation unit 74, an object management unit 76, an object information database 78, a contents management unit 80, a search index database 82, a contents information database 84, and a contents access unit 86. The retrieval unit 60 reads a group object in which a plurality of item objects are collected, calculates a relevance ratio between each of the item objects in the group object and search criteria, and separates data with a low relevance ratio from the group object based on the degree of movement of the group object when the group object is moved, so that screening search is performed. A method of determining data to be separated from the group object based on the degree of movement of the group object will be explained later.

The retrieval control unit 68 exchanges information between the object control unit 70 and the contents management unit 80, and performs screening search of the item objects based on the information supplied from each of the units. The object control unit 70 exchanges information with the object display unit 72, the object operation unit 74, and the object management unit 76, to control each behavior of various objects such as the group object, the item object, and a key object. Specifically, the object control unit 70 performs selection of objects to be displayed, determination of locations where the objects are displayed, creation of a new group object based on the determination of the retrieval control unit 68, determination and movement of a group object to which item objects belong, and the like.

The object display unit 72 sends information for the objects to be displayed which are determined based on the control by the object control unit 70 to a display control unit 88 of the display unit 62. That is, the object display unit 72 sends the information as to which group object and which item objects are to be displayed and the information as to in which location and how each of the objects is displayed, to the display control unit 88.

The object operation unit 74 determines an object to be operated and an operation of the object based on an input signal sent from the input unit 64, and sends a signal of the object as the determined operation target and a signal of the determined operation to the object control unit 70.

The object management unit 76 includes a function of managing the objects, and the object information database 78 is a storage means for storing therein information for each of the objects. As the information for each of the objects, various pieces of information required for screening search and an operation of each of the objects, such as information indicating which group object the object belongs to and information for calculating a relevance ratio of an object upon screening search, are stored therein. The object information database 78 stores therein information for the objects displayed on the screen of the display device 32. The object management unit 76 read information from the object information database 78 as necessary to sent it to the object control unit 70, and updates the information stored in the object information database 78 when the information for the object is updated.

The contents management unit 80 includes the search index database 82, the contents information database 84, and the contents access unit 86. The contents management unit 80 reads files of photograph, music data, data of the address book, and the like stored in the internal storage 40 and the external storage 46 via the contents control unit 66, and writes each of the files to the internal storage 40 and the external storage 46.

The search index database 82 stores therein information for relevance ratios used for screening search. The search index database 82 may store therein, as necessary, information for search other than the information for the relevance ratios.

The contents information database 84 stores therein audio data, image files, data for Internet sites, and the like, which are item objects. That is, the contents information database 84 stores therein information (audio information and image information) for files corresponding to the item objects displayed on the screen. The contents information database 84 also stores therein, as required, information for files of item objects other than the item objects displayed on the display device 32. The contents access unit 86 exchanges information with the contents control unit 66, reads file information acquired by the contents control unit 66 and software information or the like, and sends the file information and the software information, sent from the contents management unit 80, to the contents control unit 66.

The display unit 62 includes the display control unit 88 and a drawing engine unit 90, generates an image signal of an image displayed on the display device 32 based on the information sent from the object display unit 72 of the retrieval unit 60, and sends the generated image signal to the display device 32. The display control unit 88 creates an image to be displayed based on the information sent from the object display unit 72, that is, based on the information as to which object is displayed, at which location the object is displayed, and how the object is displayed. The drawing engine unit 90 converts the image created by the display control unit 88 to an image signal and sends the converted image signal to the display device 32. Thus, the display device 32 displays the image created by the display unit 62 based on the information sent from the retrieval unit 60. When other pieces of software have been activated, the display unit 62 generates an image based on the information sent from various pieces of software other than the information sent from the object display unit 72.

The input unit 64 includes an input interface (I/F) control unit 92, and sends an operation of the operator detected by the input device 34 to the object operation unit 74. The input interface control unit 92 converts the signal sent from the input device 34 into a signal analyzable by the retrieval unit 60, and sends the converted signal to the object operation unit 74.

The contents control unit 66 includes a file system 94, and reads information from the internal storage 40 and/or the external storage 46, sends the read information to the contents access unit 86, and writes the information sent from the contents access unit 86 to the internal storage 40 and/or the external storage 46. The file system 94 is a function of managing read/write of information.

Figure 3:
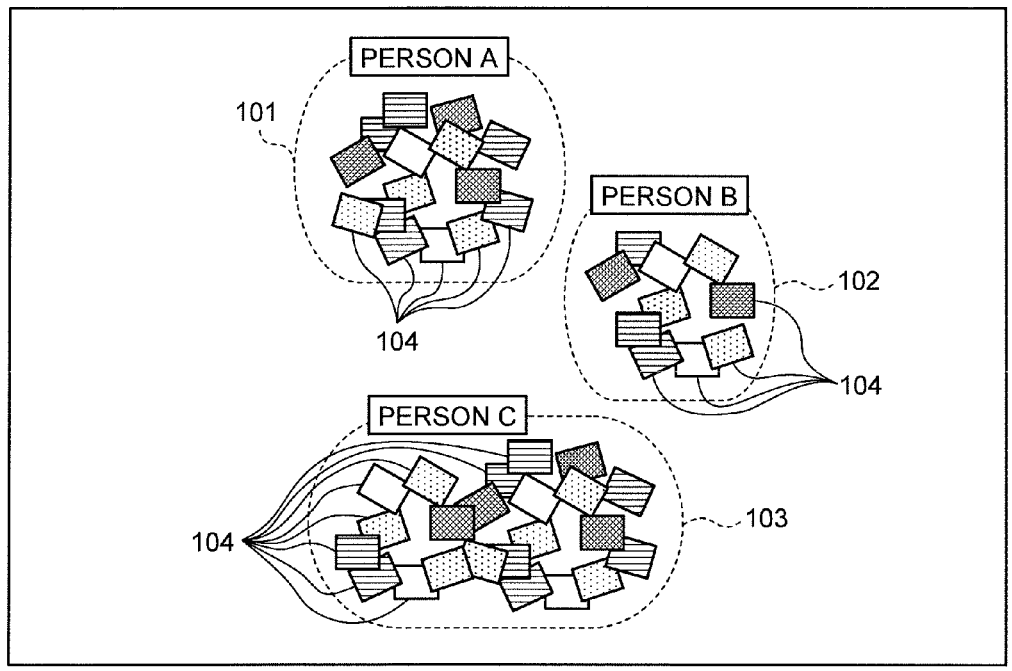
FIG. 3 is an explanatory diagram illustrating an example of an image displayed on a display device.

Here, images displayed on the screen when the screening search is performed will be explained with reference to FIG. 3 to FIG. 13. FIG. 3 to FIG. 6, FIG. 8, FIG. 10, and FIG. 12 are explanatory diagrams illustrating an example of the images displayed on the display device 32. FIG. 7, FIG. 9, FIG. 11, and FIG. 13 are diagrams illustrating an example of relevance ratios of the item objects illustrated in FIG. 6. As illustrated in FIG. 3, three group objects 101 to 103, each containing a plurality of item objects 104, are displayed on the display device. In the example of FIG. 3, the group objects 101 to 103 are folders in which the item objects 104 are stored, and the group object 101 named as "Person A", the group object 102 named as "Person B", and the group object 103 named as "Person C" are displayed. An outer periphery of a display area of each of the group objects 101 to 103 is surrounded by dotted line. That is, a boundary between the group object and the other portion is displayed. Displayed inside of the group objects 101 to 103 are the item objects 104 belonging to the group objects 101 to 103, respectively.

The item object 104 is formed with an image file, and thumbnail images of image files are displayed as the item objects 104 on the display device 32. In the present embodiment, a relevance ratio to preset criteria is assumed to be calculated for each of the item objects 104. The calculated relevance ratio may be added to the item object 104 as additional information such as a tag, or a table or the like in which each of the item objects 104 and its relevance ratio are associated with each other may be stored in the search index database 82 (see FIG. 2).

Next, a method of operating a screening search will be explained with reference to FIG. 4 and FIG. 5. In the present embodiment, the operator is assumed to operate the group object 101 named as "Person A" (hereinafter, simply called "group object 101"), and in FIG. 4 and FIG. 5, the display of the other group objects are omitted.

In the present embodiment, a case where, when the screening search is performed on group objects, a group object displayed on the display panel corresponding to a touch area on the touch panel is selected and the screening search is performed on the selected group object according to the touch on the touch panel will be explained. When the user slides the touch position on the touch panel while an arbitrary group object is selected, a display position of the selected group object is changed according to the slide of the touch position. The group object moves across the display due to the touch slide, and is thereby displayed with the movement. During the movement of the group object, an item object with a low relevance ratio is separated from the group object based on the degree (speed, distance, and the like are exemplified) of movement of the group object on the display screen, i.e., movement in appearance. In other words, a threshold of the relevance ratio being criteria for screening out the item objects is changed based on the degree of the movement of the group object by the operator, and an item object with a relevance ratio of the threshold or less is separated from the group object. The present embodiment is configured to decrease the threshold when the group object is slowly slid and to increase the threshold when the group object is quickly slid. This is called "screening search" in the present embodiment.

Figure 4:
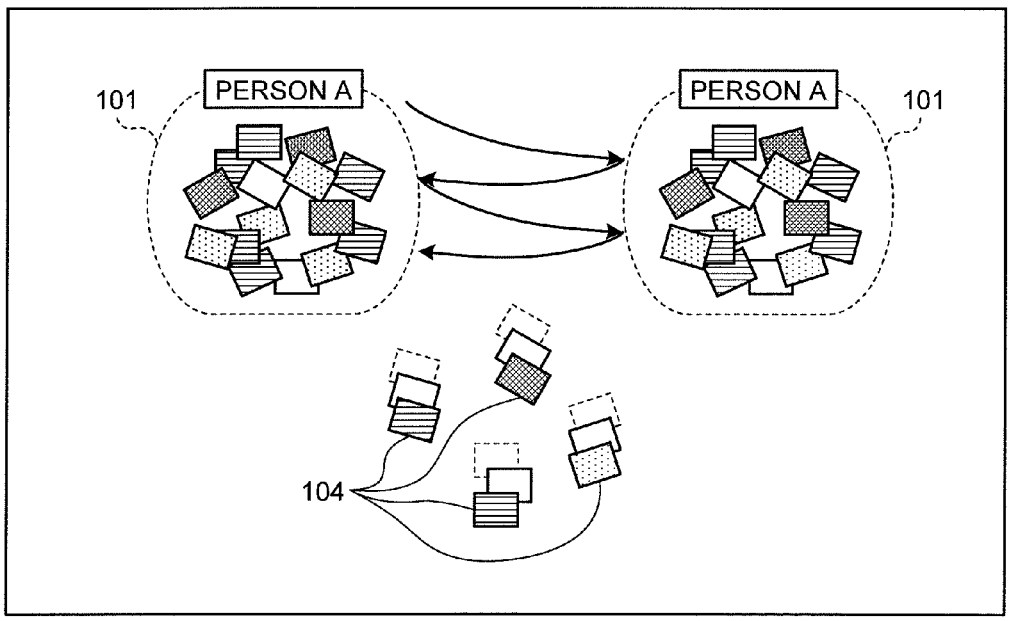
FIG. 4 is an explanatory diagram illustrating an example of the image displayed on the display device.

As illustrated in FIG. 4, when the operator touches the group object 101 and slowly performs a screening operation in a horizontal direction in the figure, it is determined that the degree of movement of the group object is low, and the threshold of the relevance ratio being criteria for screening out the item objects is set low (e.g., 30%), so that the item object 104 with a considerably low (e.g., 30% to 0%) relevance ratio is separated from the group object 101. The display position of the item object 104 with the considerably low (e.g., 30% to 0%) relevance ratio is moved (separated, screened out) from the inside of the group object 101 to the outside (downward direction in the figure). Thus, the item objects 104 with high relevance ratios (e.g., 100% to 31%) remain inside the group object 101, that is, the item objects 104 with high relevance ratios can be extracted (retrieved).

At this time, a group of the item objects 104 separated from the group object 101 and moved from the inside of the group object 101 to the outside (downward direction in the figure) may be set as a new group object. In this case, the new group object contains the item objects 104 with considerably low (e.g., 30% to 0%) relevance ratios. Thus, the item objects 104 with considerably low (e.g., 30% to 0%) relevance ratios can be extracted (retrieved).

Figure 5:
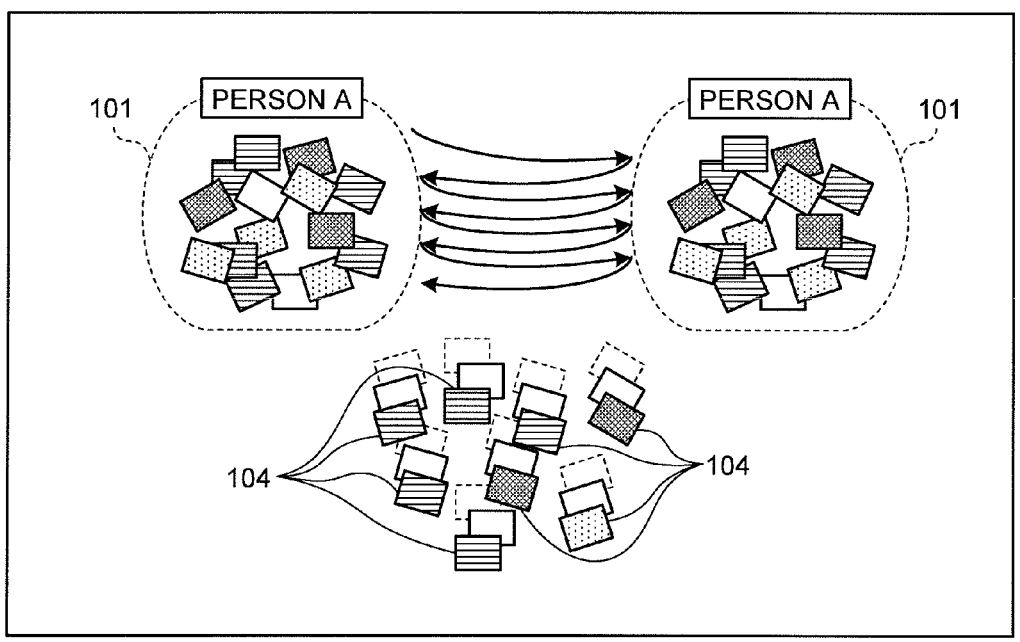
FIG. 5 is an explanatory diagram illustrating an example of the image displayed on the display device.

As illustrated in FIG. 5, when the operator touches the group object 101 and performs the screening operation in the horizontal direction in the figure more quickly than the case explained with reference to FIG. 4, it is determined that the degree of movement of the group object is high, and the threshold of the relevance ratio is set higher than the case explained with reference to FIG. 4, so that the item objects 104 with higher (e.g., 60% to 0%) relevance ratios than the case explained with reference to FIG. 4 are separated from the group object 101. The display positions of the item objects 104 with the comparatively high (e.g., 60% to 0%) relevance ratios are moved (separated, screened out) from the inside of the group object 101 to the outside (downward direction in the figure). Thus, the item objects 104 with higher relevance ratios (e.g., 100% to 61%) than the case explained with reference to FIG. 4 remain inside the group object 101, that is, the item objects 104 with higher relevance ratios than the case explained with reference to FIG. 4 can be extracted (retrieved).

At this time, a group of the item objects 104 separated from the group object 101 and moved from the inside of the group object 101 to the outside (downward direction in the figure) may be set as a new group object. In this case, the new group object contains the item objects 104 with the higher (e.g., 60% to 0%) relevance ratios than the case explained with reference to FIG. 4. Thus, the item objects 104 with the higher relevance ratios than the case explained with reference to FIG. 4 can be extracted (retrieved).

The operator can repeat the screening operation a plurality of times to extract (retrieve) item objects 104 with medium level (e.g., 60% to 31%) relevance ratios. A method of operating the screening search in the case of extracting (retrieving) the item objects 104 with the medium level (e.g., 60% to 31%) relevance ratios will be explained with reference to FIG. 6 to FIG. 13.

Figure 6:
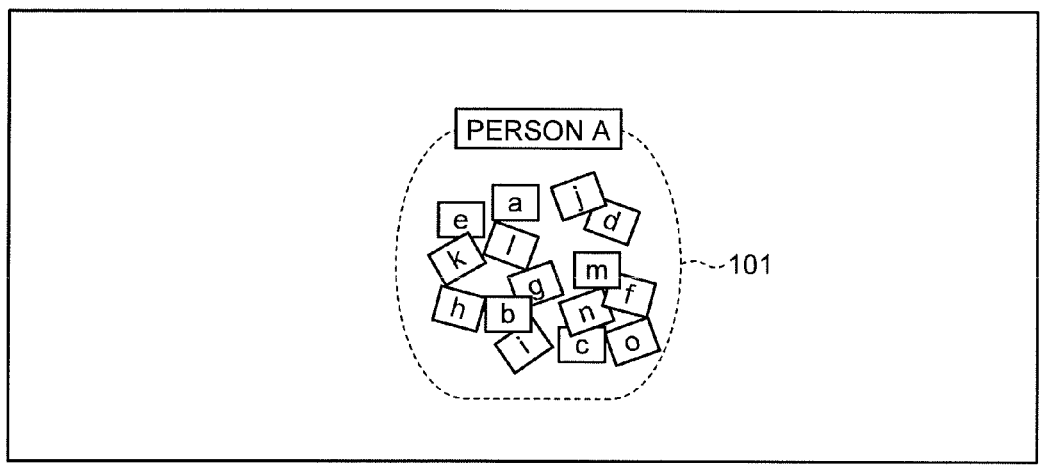
FIG. 6 is an explanatory diagram illustrating an example of the image displayed on the display device.
Figure 7:
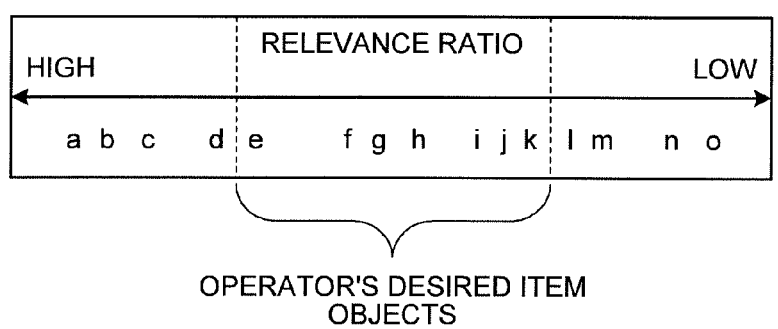
FIG. 7 is a diagram illustrating an example of relevance ratios of the item objects in FIG. 6.

As illustrated in FIG. 6, the group object 101 named as "Person A" containing 15 item objects from "a" to "o" is displayed on the display device. As mentioned above, FIG. 7 represents relevance ratios of the 15 item objects from "a" to "o". As illustrated in FIG. 7, the relevance ratios of the item objects are represented in descending order of their levels such as a>b>c>d>e>f>g>h>i>j>k>l>m>n>o. The operator is assumed to desire item objects with medium level relevance ratios (here, the item objects of "e" to "k").

Figure 8:
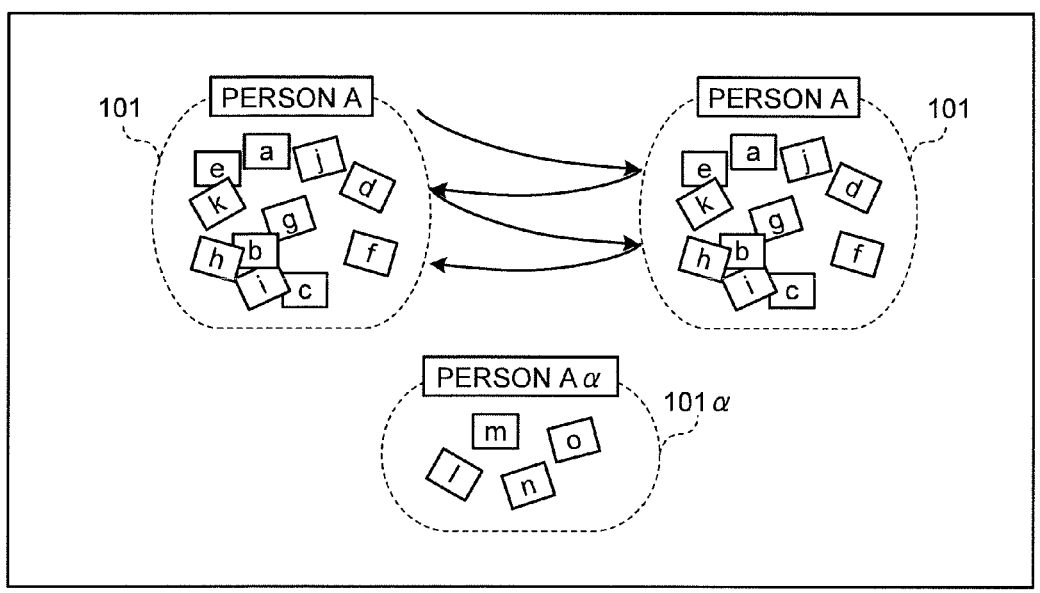
FIG. 8 is an explanatory diagram illustrating an example of the image displayed on the display device.
Figure 9:
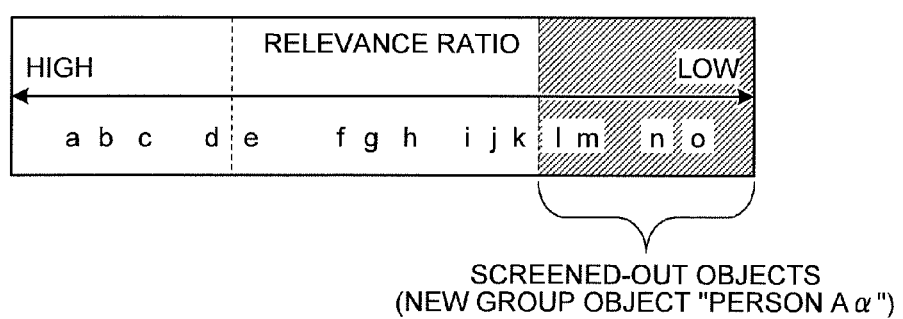
FIG. 9 is a diagram illustrating an example of the relevance ratios of the item objects in FIG. 8.
Figure 10:
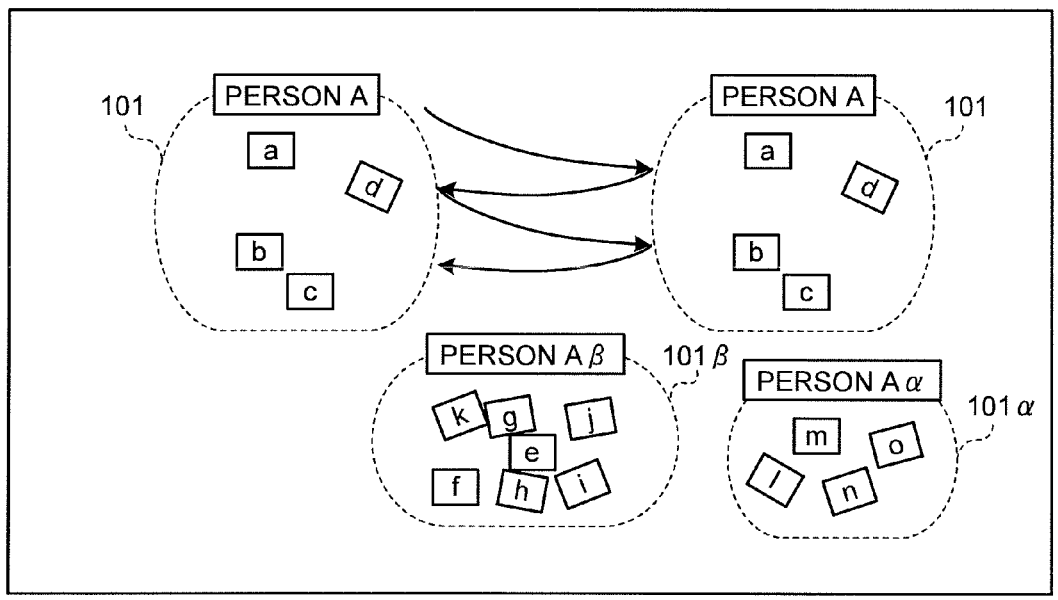
FIG. 10 is an explanatory diagram illustrating an example of the image displayed on the display device.

First, as illustrated in FIG. 8, when the operator touches the group object 101 named as "Person A" and performs the screening operation in the horizontal direction in the figure (which may be a vertical direction, a diagonal direction, or any other direction in the figure), the display positions of the item objects with considerably low relevance ratios (in this case, four item objects of "l" to "o") included in a range of the relevance ratio indicated by dark hatching in FIG. 9 are moved (separated, screened out) from the inside of the group object 101 named as "Person A" to the outside (downward direction in the figure). As a result, the item objects 104 with comparatively high relevance ratios (in this case, ten item objects of "a" to "k") remain inside the group object 101 named as "Person A".

At this time, the four item objects of "l" to "o" moved (separated, screened out) from the inside of the group object 101 named as "Person A" to the outside (downward direction in the figure) are contained in a new group object 101α named as "Person Aα".

Figure 11:
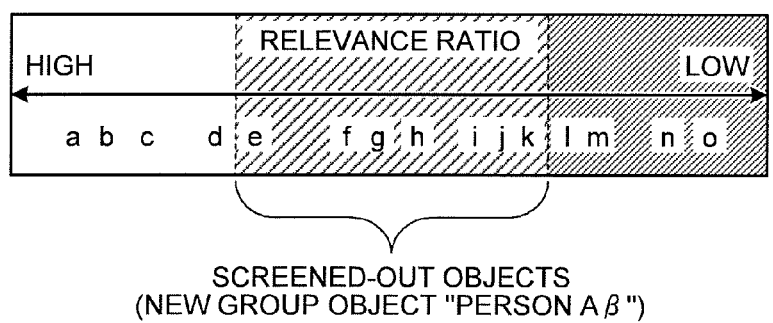
FIG. 11 is a diagram illustrating an example of the relevance ratios of the item objects in FIG. 10.

Next, as illustrated in FIG. 10, when the operator again performs the screening operation on the group object 101 named as "Person A" in the horizontal direction in the figure, the display positions of the item objects with medium level relevance ratios (in this case, seven item objects of "e" to "k") included in a range of the relevance ratios indicated by light hatching in FIG. 11 are moved (separated, screened out) from the inside of the group object 101 named as "Person A" to the outside (downward direction in the figure). As a result, the item objects with considerably high relevance ratios (in this case, four item objects of "a" to "d") remain inside the group object 101 named as "Person A".

At this time, the seven item objects of "e" to "k" moved (separated, screened out) from the inside of the group object 101 named as "Person A" to the outside (downward direction in the figure) are contained in a new group object 101β named as "Person Aβ".

Figure 12:
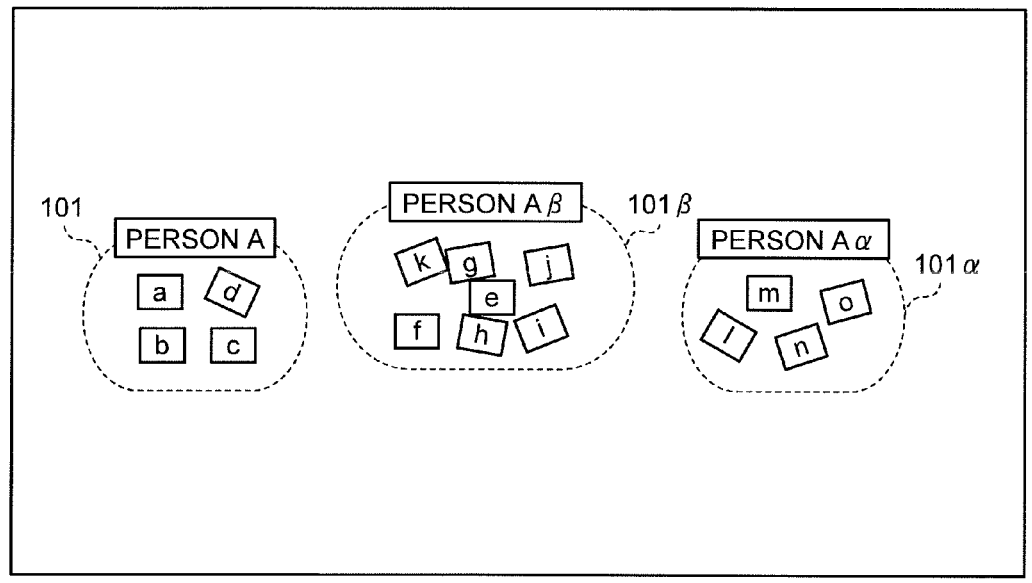
FIG. 12 is an explanatory diagram illustrating an example of the image displayed on the display device.
Figure 13:
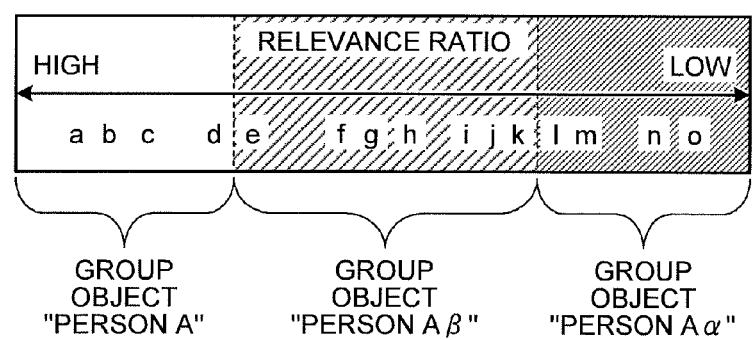
FIG. 13 is a diagram illustrating an example of the relevance ratios of the item objects in FIG. 12.

FIG. 12 is a diagram illustrating an example of a display screen of the display device 32 after the screening operation is performed twice. As illustrated in FIG. 12, the group object 101 named as "Person A" containing the four item objects of "a" to "d", the group object 101α, named as "Person Aα" containing the four item objects of "l" to "o", and the group object 101β named as "Person Aβ" containing the seven item objects of "e" to "k" are displayed on the display screen of the display device 32. FIG. 13 represents the relevance ratios of the item objects contained in the group objects 101, 101, and 101, respectively.

As explained above, the operator can repeat the screening operation a plurality of times to extract (retrieve) the item objects 104 with the medium level relevance ratios. The extraction (retrieval) of the item objects 104 with the medium level relevance ratios is useful for the following case. Specifically, it is useful for a case where the operator wants the item objects with the considerably low relevance ratios (four item objects of "l" to "o" in FIG. 6 to FIG. 13) and the item objects with the considerably high relevance ratios (four item objects of "a" to "d" in FIG. 6 to FIG. 13) nothing but to be screened out by the software process in the mobile communication apparatus 10, and wants to visually check the item objects with the medium level relevance ratios (seven item objects of "e" to "k" in FIG. 6 to FIG. 13). That is, only the item objects requiring determination as to whether they are to be extracted can be extracted, so that appropriate extraction can be performed while reducing the item objects to be visually checked.

Figure 14:
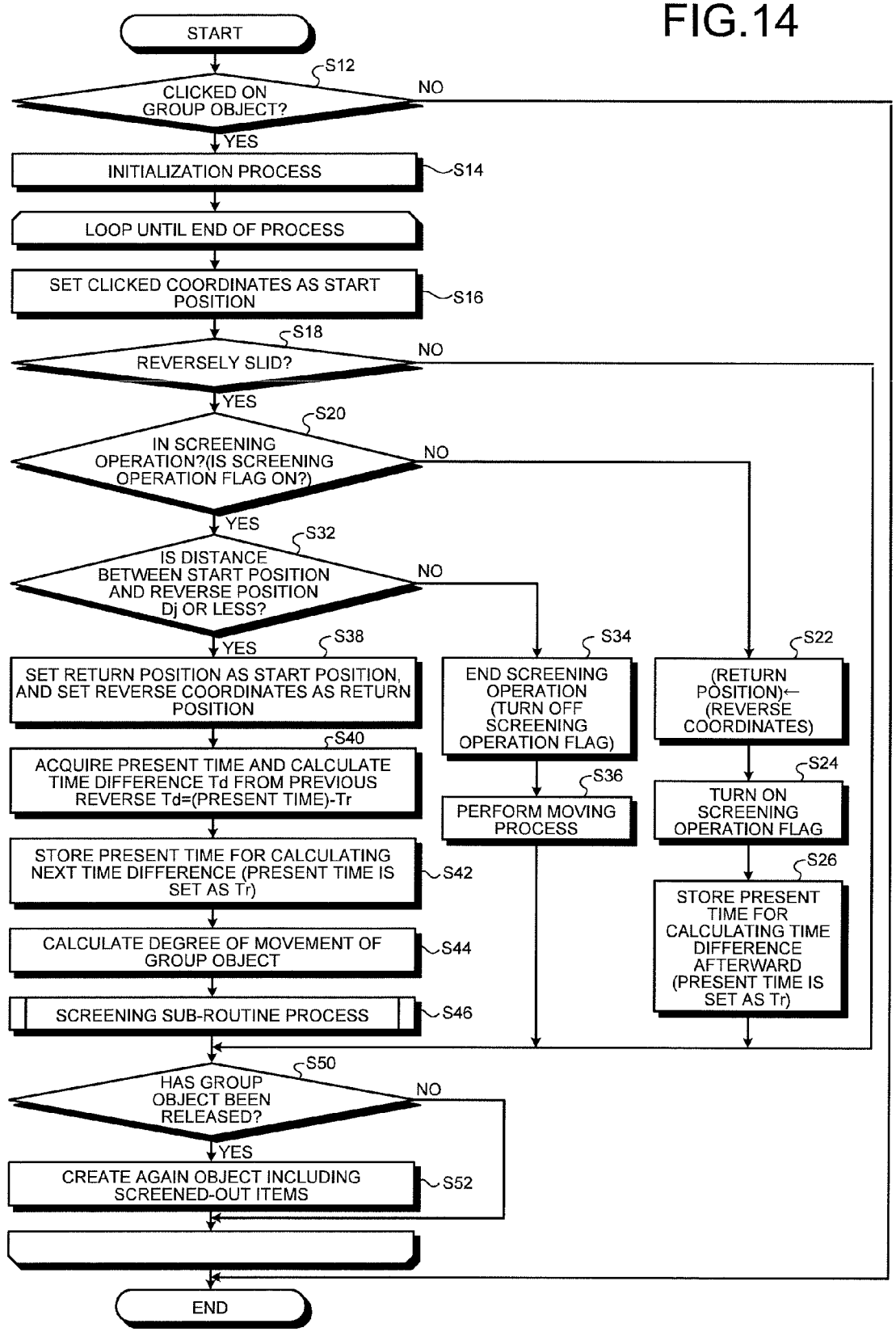
FIG. 14 is a flowchart illustrating an example of a processing operation of the mobile communication apparatus.
Figure 15:
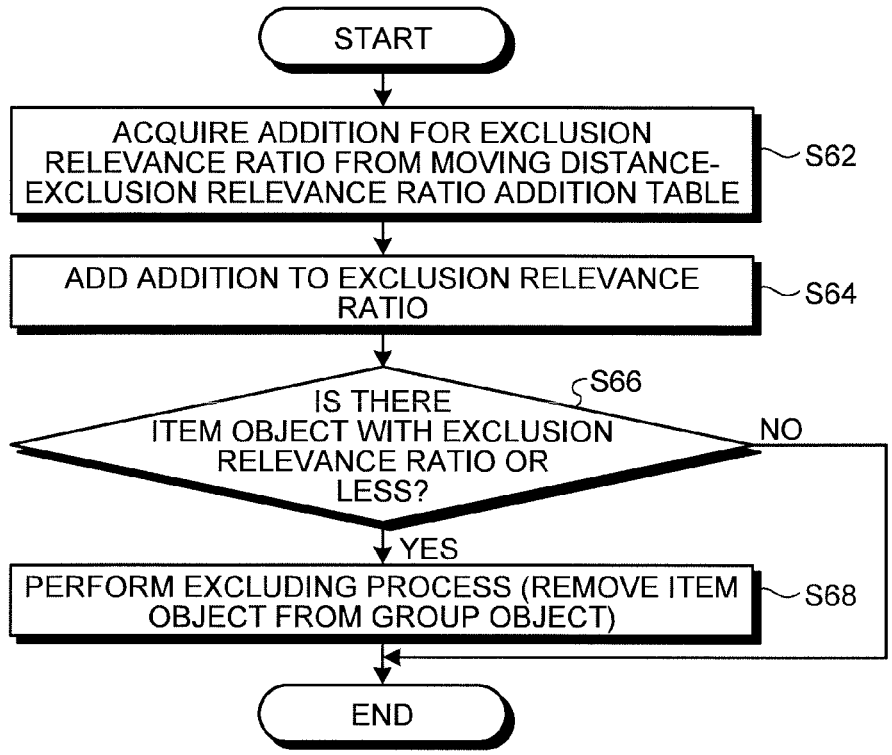
FIG. 15 is a flowchart illustrating an example of the processing operation of the mobile communication apparatus.
Figure 16:
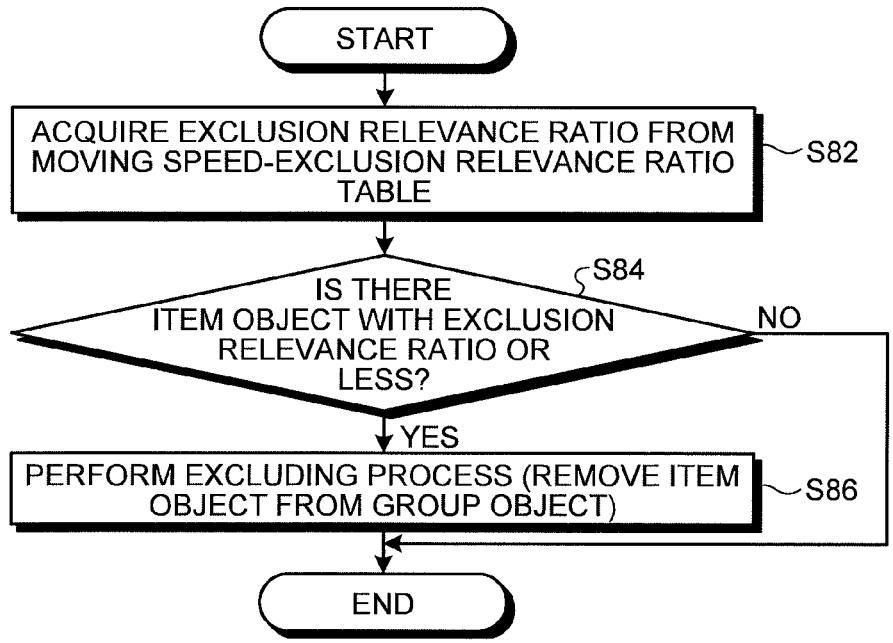
FIG. 16 is a flowchart illustrating an example of the processing operation of the mobile communication apparatus.

Next, the operation of the mobile communication apparatus 10, specifically, a search method of the screening search and an image display method following the search method will be explained with reference to FIG. 14 to FIG. 16 and FIG. 17A to FIG. 17D. FIG. 14 to FIG. 16 are flowcharts illustrating an example of a processing operation of the mobile communication apparatus, and FIG. 17A to FIG. 17D are explanatory diagrams illustrating an example of the image displayed on the display device 32. In FIG. 17A to FIG. 17D, only one group object is displayed in a simplified manner, that is, the size of the displayed group object is small and the item objects contained in the group object are omitted.

Referring to FIG. 14, the retrieval unit 60 determines whether coordinates clicked (tapped) by the operator are on the group object, at Step S12. That is, the input device 34 detects the operator's operation, the signal is input to the object operation unit 74 through the input unit 64, and the retrieval unit 60 determines whether the coordinates clicked (tapped) by the operator are on the group object. When it is determined at Step S12 that the coordinates clicked (tapped) by the operator are not on the group object (No), the retrieval unit 60 ends the process without executing the subsequent steps.

When it is determined at Step S12 that the coordinates clicked (tapped) by the operator are on the group object (Yes), the retrieval unit 60 performs an initialization process, at Step S14. As the initialization process, for example, a process is exemplified in which a screening operation flag (explained in detail later) being a flag indicating whether the screening operation is in process is cleared to OFF.

Subsequently, the retrieval unit 60 sets the clicked (tapped) coordinates as a start position and stores the start position in the object information database 78, at Step S16. The reason that the start position is stored in this manner is, as explained in detail later, because the mere sliding operation of the group object and the screening search operation are discriminated from each other. In addition, the start position may be set as any position other than the clicked (tapped) coordinates. For example, the start position may be set as a central portion, an end portion, or the like of the group object.

Subsequently, the retrieval unit 60 determines whether the group object has been reversely slid, at Step S18.

When it is determined at Step S18 that the group object has not been reversely slid by the operator (No), the retrieval unit 60 proceeds the process to Step S50. The Step S50 will be explained in detail later.

When it is determined at Step S18 that the group object has been reversely slid by the operator (Yes), the retrieval unit 60 determines whether the process is in screening operation, that is, whether the screening operation flag is ON, at Step S20. At the beginning of the operation performed by the operator, the screening operation flag is turned OFF at the initialization process (Step S14) as explained above, and therefore the retrieval unit 60 determines that the screening operation flag is not ON (No), and proceeds the process to Step S22.

When it is determined at Step S20 that the screening operation flag is not ON (No), the retrieval unit 60 sets coordinates at which the reverse sliding of the group object starts as a return position and stores the return position in the object information database 78, at Step S22. The reason that the return position is stored in this manner is, as explained in detail later, because it is prepared for a reciprocating operation of the group object performed by the operator. The retrieval unit 60 may set the center portion, the edge portion, or the like of the group object as the return position.

Subsequently, the retrieval unit 60 sets the screening operation flag to ON, at Step S24, and stores the present time as Tr in the object information database 78, at Step S26. The reason that the present time Tr is stored in this manner is, as explained in detail later, because the moving speed of the group object is calculated as an example of the degree of movement of the group object. Measurement of the time can be implemented by using a time measurement unit or time measurement software which is built into the device.

Meanwhile, when it is determined at Step S20 that the process is in screening operation, that is, that the screening operation flag is ON, the retrieval unit 60 determines whether a distance between the start position and a reverse position (position after the group object is reversely slid) is a set distance Dj or less, at Step S32. That is, it is determined whether the operator has slid the group object to within an area whose distance from the start position is the distance Dj or less.

When it is determined at Step S32 that the distance between the start position and the reverse position (position after the group object is reversely slid) is not the distance Dj or less (No), that is, that the operator has reversely slid the group object to a position outside the area whose distance from the start position is the distance Dj or less, the retrieval unit 60 determines that the operation is a operation for merely moving the group object performed by the operator, ends the screening operation, and turns OFF the screening operation flag, at Step S34. The retrieval unit 60 performs the moving process of moving the display position of the group object, at Step S36. Thereafter, the retrieval unit 60 proceeds the process to Step S50.

When it is determined at Step S32 that the distance between the start position and the reverse position (position after the group object is reversely slid) is the distance Dj or less (Yes), that is, that the operator has slid the group object to within an area whose distance from the start position is the distance Dj or less, the retrieval unit 60 sets the return position as a new start position, sets the reverse coordinates as a new return position, and stores the new return position and the new return position in the object information database 78, at Step S38. The reason that the start position and the return position are updated in this manner is, as explained in detail later, because it is prepared for the reciprocating operation of the group object performed by the operator.

Subsequently, the retrieval unit 60 acquires the present time and calculates a time difference Td from the previous reverse using the following equation, at Step S40.

$$Td = (\text{Present time}) - Tr \qquad (1)$$

The retrieval unit 60 stores the present time as Tr in the object information database 78 in order to calculate a next time difference Td, at Step S42.

The retrieval unit 60 calculates the degree of movement of the group object, at Step S44. As the degree of movement of the group object, a moving distance, a moving speed, and the like of the group object on the display screen are exemplified.

When the moving distance of the group object is used as the degree of movement of the group object, the retrieval unit 60 can calculate a moving distance D of the group object using the following equation.

$$D = (\text{Start position}) - (\text{Return position}) \qquad (2)$$

When the moving speed of the group object is used as the degree of movement of the group object, the retrieval unit 60 can calculate a moving speed V of the group object using the following equation.

$$V = D/Td \qquad (3)$$

When it is determined at Step S18 that the group object has not been reversely slid by the operator (No), when the process at Step S26 is executed, when the process at Step S36 is executed, or when the process at Step S46 is executed, the retrieval unit 60 determines whether the group object has been released by the operator, at Step S50.

When it is determined at Step S50 that the group object has not been released (No), the retrieval unit 60 ends the process. The retrieval unit 60 repeats the processes from Step S16 to the process before the end of the process until the group object is released by the operator. That is, the retrieval unit 60 repeats the determination until the group object is released by the operator, and performs the process corresponding to the subsequent operation based on the degree of movement of the group object.

When it is determined at Step S50 that the group object has been released (Yes), the retrieval unit 60 creates a new group object including screened-out item objects, and ends the process, at Step S52.

Next, a screening sub-routine process at Step S46 will be explained. FIG. 15 is a diagram illustrating the screening sub-routine process when the moving distance of the group object is used as a degree of movement of the group object.

The case where the moving distance of the group object is used as the degree of movement of the group object will be explained first. In the present embodiment, the range of relevance ratios of item objects to be screened out from the group object is changed according to the moving distance of the group object. That is, the threshold of the relevance ratio being criteria for screening out the item object from the group object is changed according to the moving distance of the group object. Specifically, the shorter the moving distance of the group object is, the lower the threshold of the relevance ratio being the criteria for screening out the item object is set, so that the item object even with the low relevance ratio is not screened out (is left inside the group object). The longer the moving distance of the group object is, the higher the threshold of the relevance ratio being the criteria for screening out the item object is set, so that only the item object with the high relevance ratio is prevented from being screened out (is left inside the group object). In the present embodiment, it is set to screen out the item objects in order from those with the lower relevance ratio. Therefore, when the range of the relevance ratios of the item objects to be screened out is made wider, this results in screening out of even the item object with the higher relevance ratio.

Referring to FIG. 15, the retrieval unit 60 refers to a moving distance-exclusion relevance ratio addition table to acquire an addition to be added to an exclusion relevance ratio (offset value), at Step S62. The exclusion relevance ratio is a preset base value. The moving distance-exclusion relevance ratio addition table stores the additions for the exclusion relevance ratio therein in association with the moving distance of the group objects respectively. The retrieval unit 60 acquires the addition from the moving distance-exclusion relevance ratio addition table using the moving distance, as a key, calculated at Step S44. The moving distance-exclusion relevance ratio addition table may be previously stored in the object information database 78.

When the acquisition of the addition for the exclusion relevance ratio at Step S62, the retrieval unit 60 adds the addition for an exclusion relevance ratio acquired at Step S62 to the exclusion relevance ratio (offset value) being the base, at Step S64. That is, the retrieval unit 60 calculates the range of the relevance ratios for screening out an item object from the group object based on the moving distance of the group object calculated at Step S44. As for the range of the relevance ratios, as explained above, the longer the moving distance of the group object is, the wider range is calculated, while the shorter the moving distance of the group object is, the narrower range is calculated. The exclusion relevance ratio (offset value) being the base may be stored in the moving distance-exclusion relevance ratio addition table in such a manner that the exclusion relevance ratio is added to each of the values in the moving distance-exclusion relevance ratio addition table and storing therein the values in advance, so that the addition process at Step S64 can be omitted.

After the calculation of the exclusion relevance ratio (threshold) at Step S64, the retrieval unit 60 determines whether an item object with a relevance ratio equal to or less than the exclusion relevance ratio is contained in the group object, at Step S66. When it is determined at Step S66 that the item object with the relevance ratio equal to or less than the exclusion relevance ratio is not contained in the group object (No), the retrieval unit 60 ends the screening sub-routine process.

When it is determined at Step S66 that the item object with the relevance ratio equal to or less than the exclusion relevance ratio is contained in the group object (Yes), the retrieval unit 60 performs the process of separating (excluding, not including, or removing) the item object from (in) the group object, at Step S68, and ends the screening sub-routine process.

Next, the case where the moving speed of the group object is used as a degree of movement of the group object will be explained with reference to FIG. 16. FIG. 16 is a diagram illustrating a screening sub-routine process when the moving speed of the group object is used as a degree of movement of the group object. In the present embodiment, the range of the relevance ratios being criteria for screening out an item object from the group object is changed according to the moving speed of the group object. That is, the threshold of the relevance ratio being criteria for screening out an item object from the group object is changed according to the moving speed of the group object. Specifically, the slower the moving speed of the group object is, the lower the threshold of the relevance ratio being the criteria for screening out the item object is set, so that the item object even with the low relevance ratio is not screened out (is left inside the group object). The faster the moving speed of the group object is, the higher the threshold of the relevance ratio being the criteria for screening out the item object is set, so that only the item object with the high relevance ratio is prevented from being screened out (is left inside the group object). In the present embodiment, it is set to screen out the item objects in order from those with the lower relevance ratio. Therefore, when the range of the relevance ratios is made wider, this results in screening out of even the item object with the higher relevance ratio.

Referring to FIG. 16, the retrieval unit 60 refers to a moving speed-exclusion relevance ratio table to acquire an exclusion relevance ratio (threshold), at Step S82. The moving speed-exclusion relevance ratio table stores the exclusion relevance ratios in association with the moving speed of the group object respectively. The retrieval unit 60 acquires the exclusion relevance ratio from the moving speed-exclusion relevance ratio table using the moving speed, as a key, calculated at Step S44. That is, the retrieval unit 60 calculates the range of the relevance ratios for screening out the item object from the group object based on the moving speed of the group object calculated at Step S44. As for the range of the relevance ratios, as explained above, the faster the moving speed of the group object is, the wider range is calculated, while the slower the moving speed of the group object is, the narrower range is calculated. The moving speed-exclusion relevance ratio table may be previously stored in the object information database 78.

When the acquisition of the exclusion relevance ratio (threshold) at Step S82, the retrieval unit 60 determines whether an item object with a relevance ratio equal to or less than the exclusion relevance ratio is contained in the group object, at Step S84. When it is determined at Step S84 that the item object with the relevance ratio equal to or less than the exclusion relevance ratio is not contained in the group object (No), the retrieval unit 60 ends the screening sub-routine process.

When it is determined at Step S84 that the item object with the relevance ratio equal to or less than the exclusion relevance ratio is contained in the group object (Yes), the retrieval unit 60 performs the process of separating (excluding, not including, or removing) the item object from (in) the group object, at Step S86, and ends the screening sub-routine process.

Figure 17A:
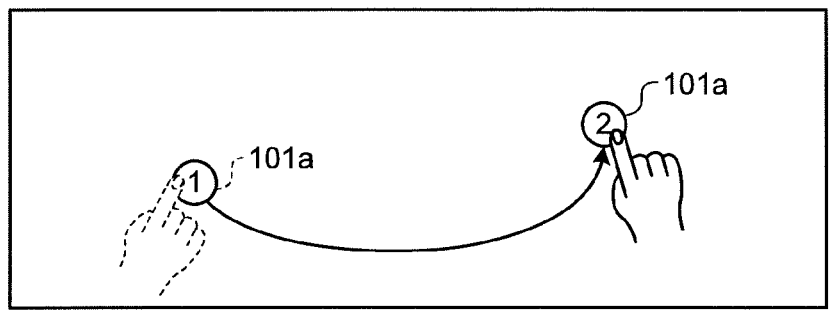
FIG. 17A is an explanatory diagram for explaining an operation of the mobile communication apparatus.

Next, examples of operation performed by the operator will be explained with reference to FIG. 17A to FIG. 17D. Referring to FIG. 17A, coordinates clicked (tapped) by the operator on a group object 101a displayed on the left side of the figure in the display device 32 (indicated by "1" in FIG. 17A for convenience) are stored as the start position in the object information database 78 (see Step S16 in FIG. 14). The operator drags the group object 101a to the right side of the figure in the display device 32 (indicated by "2" in FIG. 17A).

Figure 17B:
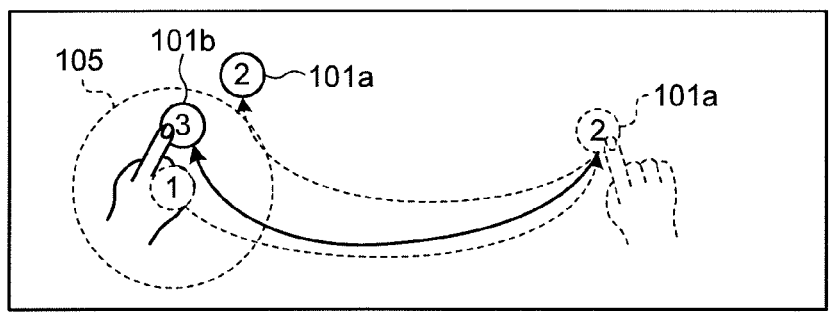
FIG. 17B is an explanatory diagram for explaining the operation of the mobile communication apparatus.

Referring to FIG. 17B, after the operation of dragging the group object 101a to the right side of the figure in the display device 32 (indicated by "2" in FIG. 17B), the operator drags the group object 101a to the left side of the figure in the display device 32. At this time, the retrieval unit 60 determines whether the operator drags the group object 101a to within an area 105 whose distance from the start position (indicated by "1" in FIG. 17B) is the distance Dj (indicated by "3" in FIG. 17B) or to outside the area 105 (indicated by "2" in FIG. 17B) (see Step S18 in FIG. 14).

Figure 17C:
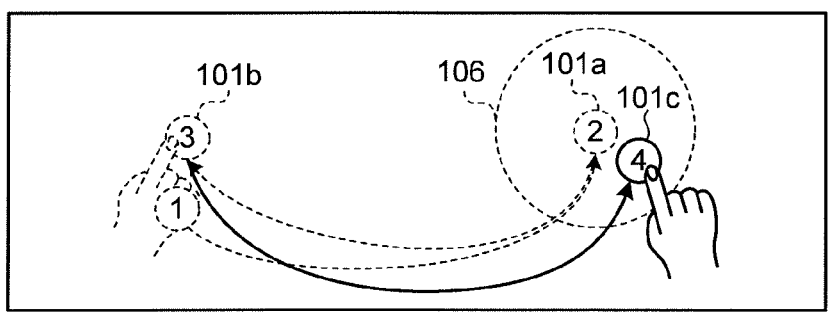
FIG. 17C is an explanatory diagram for explaining the operation of the mobile communication apparatus.
Figure 17D:
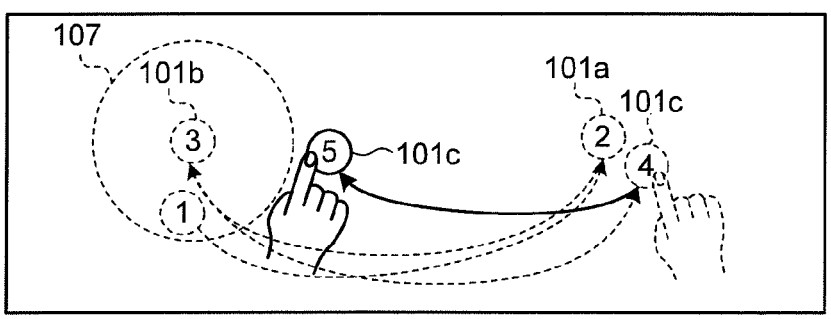
FIG. 17D is an explanatory diagram for explaining the operation of the mobile communication apparatus.

Referring to FIG. 17C, when the operator drags a group object 101b (indicated by "3" in FIG. 17C) to within an area 106 (indicated by "4" in FIG. 17C), whose distance from the start position (indicated by "2" in FIG. 17C) is the distance Dj or less, the retrieval unit 60 repeatedly performs Step S16 to Step S52 in FIG. 14 to perform a screening search process based on the degree of movement of the group object 101b. Thereafter, as illustrated in FIG. 17D, when the operator drags a group object 101c (indicated by "4" in FIG. 17D) to outside an area 107 whose distance from the start position (indicated by "3" in FIG. 17D) is the distance Dj or less, the retrieval unit 60 determines that the distance between the start position and the reverse position (indicated by "5" in FIG. 17D) is not the distance Dj or less (No) (see Step S32 in FIG. 14), ends the screening operation (see Step S34 in FIG. 14), and performs the moving process of the group object 101c (see Step S36 in FIG. 14).

In the present embodiment, because a detection timing of the coordinates and that of the time are the same as each other, the moving distance and the moving speed bear a proportional relation. Therefore, even if the threshold is calculated using either one of the moving distance and the moving speed, calculated thresholds are the same as each other. In the present embodiment, the moving speed is set as an average moving speed, however, the range of the relevance ratios may be set based on the maximum value of the moving speed instead of the average moving speed. For example, the maximum speed of the moving speed, regardless of the moving distance, is calculated, and if the maximum speed is high, then the range of the relevance ratios may be widened, while if the maximum speed is low, then the range of the relevance ratios may be narrowed. Alternatively, these calculation methods may be combined with each other.

In the present embodiment, a liquid-crystal display device is used as the display device and the touch panel is used as the input device, however, the present invention is not limited thereto. For example, a projection device such as a projector may be used as the display device and a touch detector for detecting a touch input to a display area of a projected image may be used as the input device. Specifically, the operator puts his/her hand in the display area, brings the hand to an area where the object is displayed, and moves the hand from that state within the display area. Such operations of the hand are detected by the touch detector, so that the control similar to the above can be performed.

In the present embodiment, when the group object is moved, an item object with a lower relevance ratio than the threshold being the criteria for screening out item objects is screened out. However, an item object with a higher relevance ratio than the threshold being the criteria for screening out item objects may be screened out.

When the group object is slid a plurality of times (see FIG. 6 to FIG. 13), the sliding at the second time and thereafter may be implemented by using the previous threshold for calculating the threshold being the criteria for screening out the item object (for example, a start value of the present threshold may be used as the previous threshold). This enables a screening process at the second time and thereafter to be quickly performed.

When the operator selects and slides a new group object created by the screening process, then the retrieval unit 60 may perform the screening process on the new group object. This enables the item object with a medium level relevance ratio to be extracted (retrieved).

The mobile communication apparatus 10 separates an item object with a low relevance ratio from the group object based on the degree of movement of the group object in the above manner, and the operator can thereby visually recognize the state of the extracted (retrieved) result. This enables the operator to easily obtain his/her desired search result. In addition, the level of the relevance ratio can be easily adjusted by the operator's operation, thus improving operability for the operator.

By forming the item objects separated from the group object as a new group object, selection of a target operation becomes easy, thus improving operation efficiency.

By separating the item object with the low relevance ratio from the group object based on the degree of movement of the group object, the operator can adjust extraction (retrieval) by an analog sense.

By separating the item object with the low relevance ratio from the group object based on the degree of movement of the group object, the operator can visually check the state of extraction (retrieval, narrowing down), thus easily acquiring a desired item object.

By separating the item object with the low relevance ratio from the group object based on the degree of movement of the group object, the operator can intuitively perform the extraction (retrieval, narrowing down).

By separating the item object with the low relevance ratio from the group object based on the degree of movement of the group object, the operator can easily adjust the degree of the extraction (retrieval, narrowing down).

The operator can repeat the screening operation a plurality of times to extract (retrieve) the item object with the medium level relevance ratio.

Second Embodiment

Figure 18:
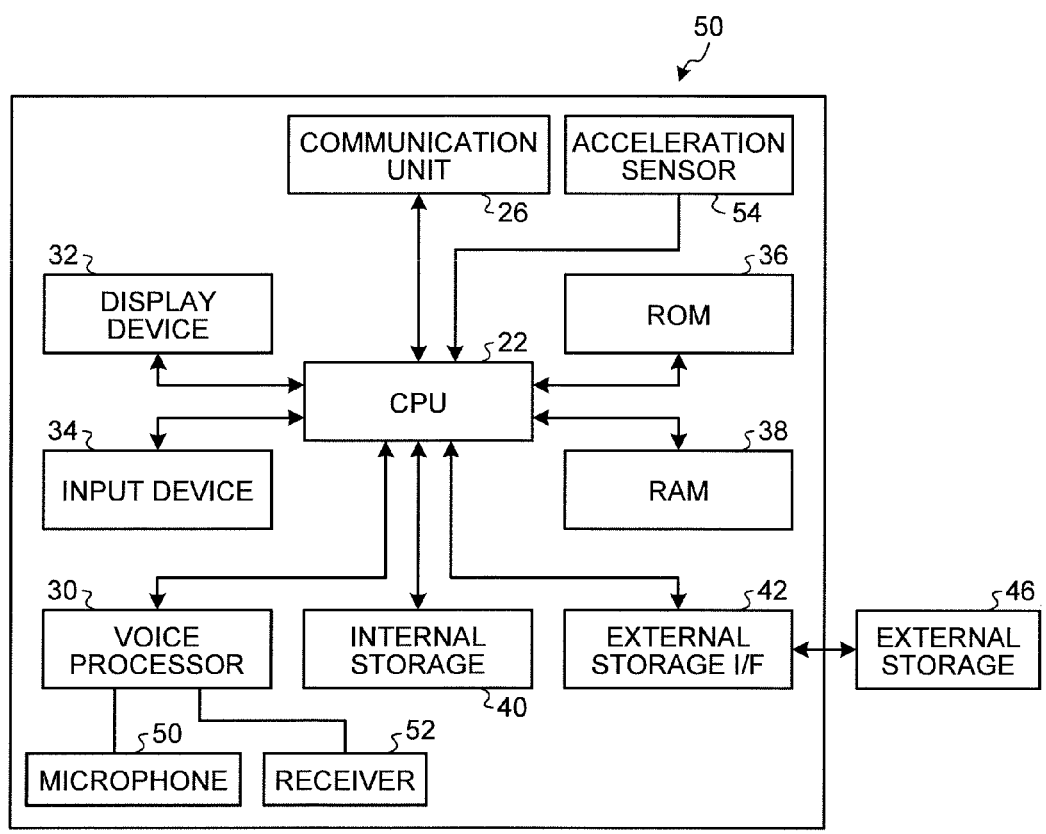
FIG. 18 is a block diagram illustrating a schematic configuration of a second embodiment of the mobile communication apparatus of the present invention.

Next, a second embodiment of the data retrieval apparatus according to the present invention will be explained. FIG. 18 is a block diagram illustrating a schematic configuration of the second embodiment of the data retrieval apparatus according to the present invention. In the present embodiment, the present invention is applied to the mobile communication apparatus. As illustrated in FIG. 18, a mobile communication apparatus 50 is basically configured to add an acceleration sensor 54 to the mobile communication apparatus 10 (see FIG. 1) of the first embodiment. An outer shape of the mobile electronic communication device 50 can be various shapes such as a foldable shape configured with two members coupled to each other by a hinge, a shape in which two members are slid each other, and a one box shape.

The acceleration sensor 54 is a detector for detecting an acceleration applied to a housing of the mobile communication apparatus 50. A detector (detection sensor) for detecting an acceleration by various methods can be used as the acceleration sensor 54, and, for example, a detector for detecting an acceleration using change in capacitance, change in piezoresistance, change in relative position, or the like can be used. The acceleration sensor 54 detects an acceleration acting on the housing of the mobile communication apparatus 50 when the operator shakes or moves the housing of the mobile communication apparatus 50.

Figure 19:
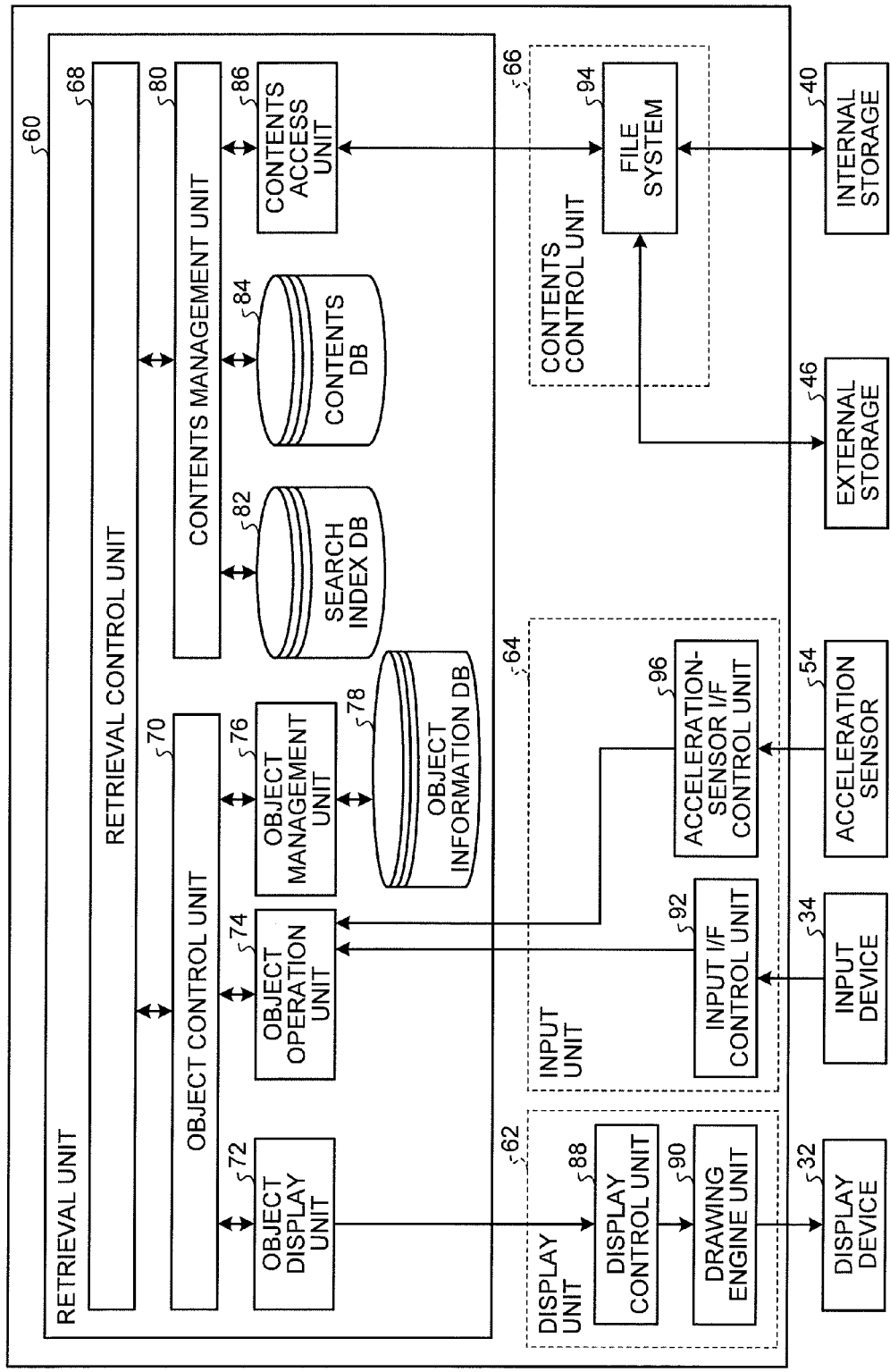
FIG. 19 is a block diagram illustrating a schematic configuration of software of the mobile communication apparatus in FIG. 18.

Next, the configuration of software of the mobile communication apparatus 50 will be explained with reference to FIG. 19. FIG. 19 is a block diagram illustrating a schematic configuration of software of the mobile communication apparatus 50. The schematic configuration of the software of the mobile communication apparatus 50 is basically configured, as illustrated in FIG. 19, to add an acceleration-sensor interface (I/F) control unit 96 to the schematic configuration of the software of the mobile communication apparatus 10 (see FIG. 1) according to the first embodiment.

The input unit 64 includes the input interface (I/F) control unit 92 and the acceleration-sensor interface (I/F) control unit 96, and sends operations of the operator detected by the input device 34 and the acceleration sensor 54 to the object operation unit 74. The input interface control unit 92 converts the signal sent from the input device 34 into a signal analyzable by the retrieval unit 60, and sends the converted signal to the object operation unit 74. The acceleration-sensor interface control unit 96 converts the signal sent from the acceleration sensor 54 into a signal analyzable by the retrieval unit 60, and sends the converted signal to the object operation unit 74.

In the first embodiment, the operator operates the input device 34 (the touch panel is exemplified) to slide the group object, and the screening search is performed thereon. However, in the present embodiment, the operator moves (shakes) the housing of the mobile communication apparatus 50 to slide the group object, so that the screening search is performed.

Figure 20:
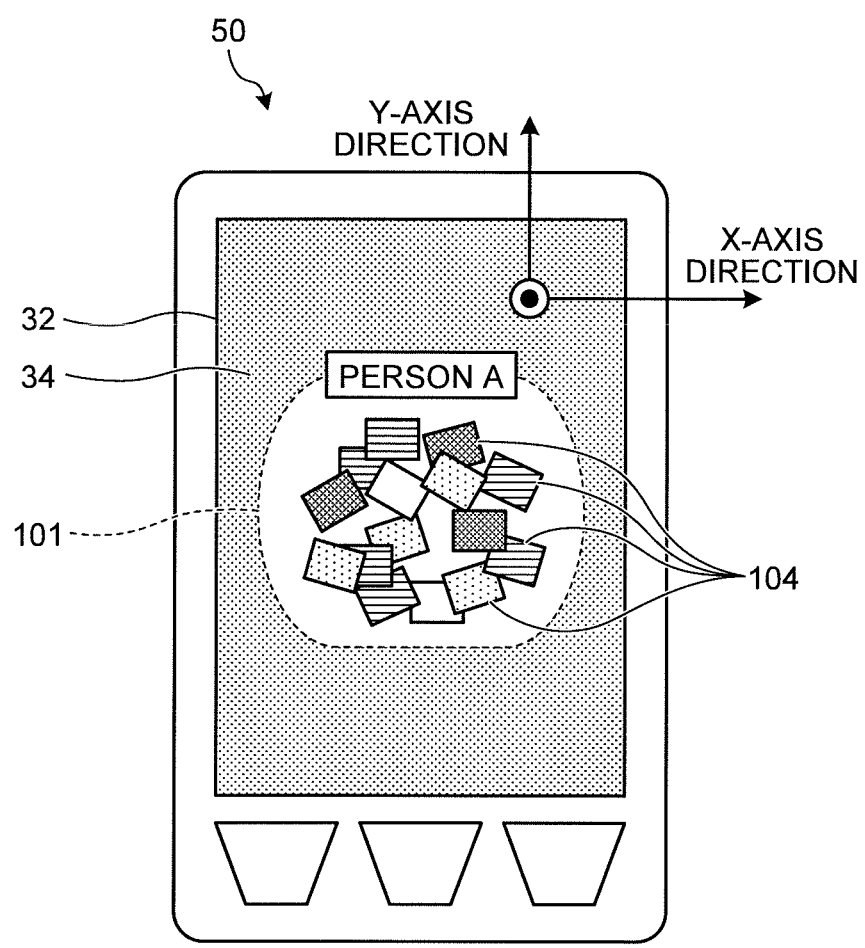
FIG. 20 is a diagram illustrating a plan view of the second embodiment of the mobile communication apparatus of the present invention.

FIG. 20 is a diagram illustrating an example of a plan view of the mobile communication apparatus 50. In FIG. 20, a rightward direction in this figure is an X-axis direction, an upward direction in this figure is a Y-axis direction, and a direction perpendicular to the plane of paper is a Z-axis direction. Here, a case where the operator moves (shakes) the mobile communication apparatus 50 in the X-axis direction is explained as an example.

Figure 21:
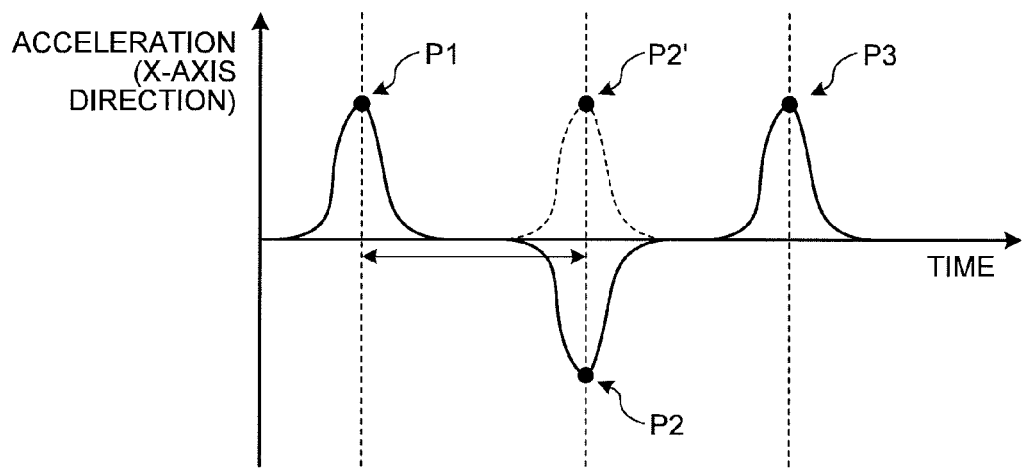
FIG. 21 is a graph illustrating an example of an acceleration applied to the mobile communication apparatus.
Figure 22:
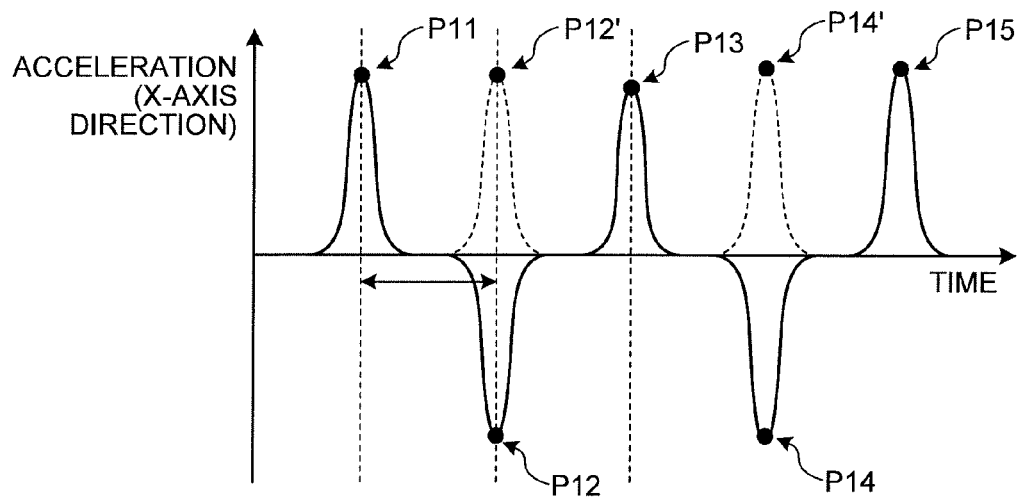
FIG. 22 is a graph illustrating an example of an acceleration applied to the mobile communication apparatus.

Next, a method of operating the screening search will be explained with reference to FIG. 21 and FIG. 22. FIG. 21 and FIG. 22 illustrate an example of a graph in which the horizontal-axis direction represents time and the vertical-axis direction represents acceleration applied to the mobile communication apparatus 50.

In the present embodiment, the item object with the low relevance ratio is separated from the group object based on the degree of movement of the group object (in this case, a peak value of acceleration, a period of time between the time of a peak value of the previous acceleration and the time of a peak value of the present acceleration, and the like are exemplified) when the group object moves due to movement (shaking) of the housing of the mobile communication apparatus 50 by the operator. That is, the threshold of the relevance ratio is changed based on the degree of movement of the group object (the peak value of the acceleration, etc.), and the item object with the relevance ratio equal to or less than the threshold is separated from the group object.

As illustrated in FIG. 21, when the operator slowly moves (shakes) the housing of the mobile communication apparatus 50 alternately in the X-axis direction and the opposite direction to the X-axis direction, the group object 101 named as "Person A" (see FIG. 20) slowly moves alternately in the X-axis direction and the opposite direction to the X-axis direction. In FIG. 21, a point P1 to a point P3 are peak points of accelerations, and a point P2' is a symmetrical point to the point P2.

When the group object 101 named as "Person A" (see FIG. 20) slowly moves alternately in the X-axis direction and the opposite direction to the X-axis direction, the threshold of the relevance ratio is set to be low (e.g., 30%), and the item object 104 with a considerably low relevance ratio (e.g., 30% to 0%) is separated from the group object 101 named as "Person A". The display position of the item object with the considerably low relevance ratio (e.g., 30% to 0%) is moved (separated, screened out) from the inside of the group object 101 named as "Person A" to the outside (downward direction in FIG. 20). Thus, the item object 104 with the high relevance ratio (e.g., 100% to 31%) remains inside the group object 101 named as "Person A", that is, the item object 104 with the high relevance ratio can be extracted (retrieved).

At this time, the item objects 104 separated from the group object 101 named as "Person A" and moved from the inside of the group object 101 named as "Person A" to the outside (downward direction in FIG. 20) may be set as a new group object. In this case, the new group object contains the item objects 104 with the considerably low relevance ratios (e.g., 30% to 0%). Thus, the item objects 104 with the considerably low relevance ratios (e.g., 30% to 0%) can be extracted (retrieved).

As illustrated in FIG. 22, when the operator moves (shakes) the housing of the mobile communication apparatus 50 alternately in the X-axis direction and the opposite direction to the X-axis direction more quickly than the case explained with reference to FIG. 21, the group object 101 named as "Person A" moves alternately in the X-axis direction and the opposite direction to the X-axis direction more quickly than the case explained with reference to FIG. 21 (a peak-to-peak time interval becomes shorter). In FIG. 22, a point P11 to a point P15 are peak points of accelerations, and a point P12' and a point P14' are symmetrical points to the point P12 and the point P14, respectively.

When the group object 101 named as "Person A" moves alternately in the X-axis direction and the opposite direction to the X-axis direction more quickly than the case explained with reference to FIG. 21, the threshold of the relevance ratio is set to be higher than the case explained with reference to FIG. 21, and the item objects 104 with comparatively higher relevance ratios (e.g., 60% to 0%) than the case explained with reference to FIG. 21 are separated from the group object 101 named as "Person A". The display positions of the item objects 104 with the comparatively high relevance ratios (e.g., 60% to 0%) are moved (separated, screened out) from the inside of the group object 101 named as "Person A" to the outside (downward direction in FIG. 20). Thus, the item objects 104 with the higher relevance ratios (e.g., 100% to 61%) than the case explained with reference to FIG. 21 remain inside the group object 101 named as "Person A", that is, the item objects 104 with the higher relevance ratios than the case explained with reference to FIG. 21 can be extracted (retrieved).

At this time, the item objects 104 separated from the group object 101 named as "Person A" and moved from the inside of the group object 101 named as "Person A" to the outside (downward direction in FIG. 20) may be set as a new group object. In this case, the new group object contains the item objects 104 with higher relevance ratios (e.g., 60% to 0%) than the case explained with reference to FIG. 22. Thus, the item objects 104 with the higher relevance ratios (e.g., 60% to 0%) than the case explained with reference to FIG. 22 can be extracted (retrieved).

The operator can repeat such operations as above a plurality of times to extract (retrieve) the item object 104 with the medium level relevance ratio (e.g., 60% to 31%), which is the same as the first embodiment.

Figure 23:
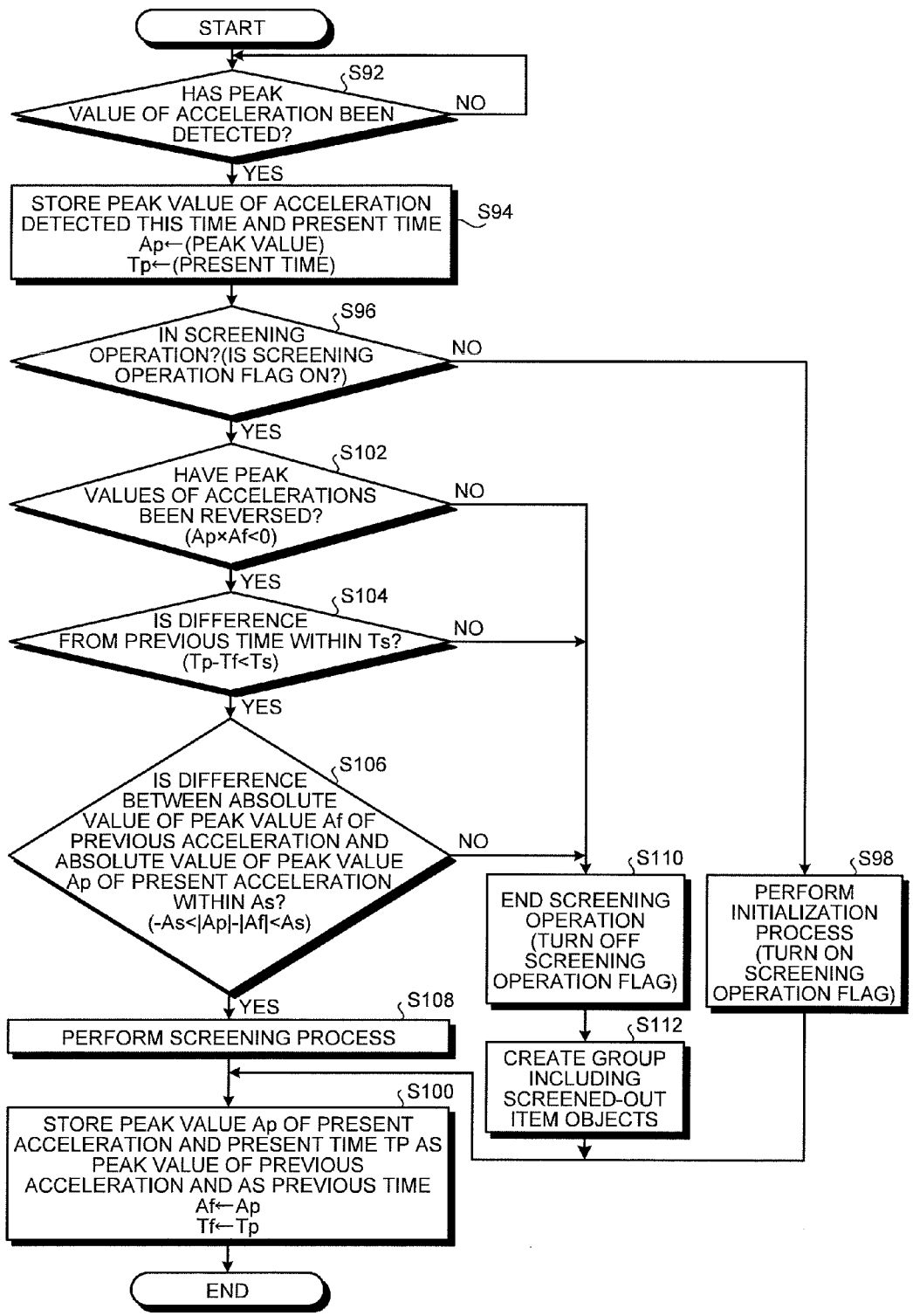
FIG. 23 is a flowchart illustrating an example of the processing operation of the mobile communication apparatus.
Figure 24:
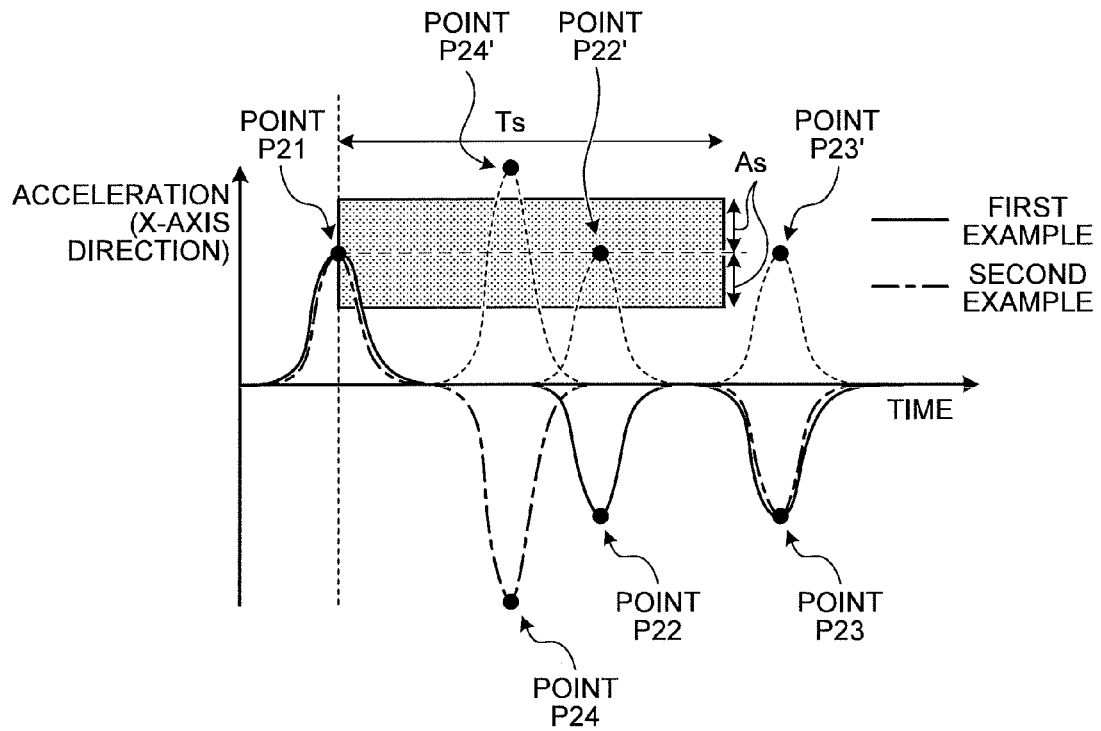
FIG. 24 is a graph illustrating an example of an acceleration applied to the mobile communication apparatus.
Figure 25:
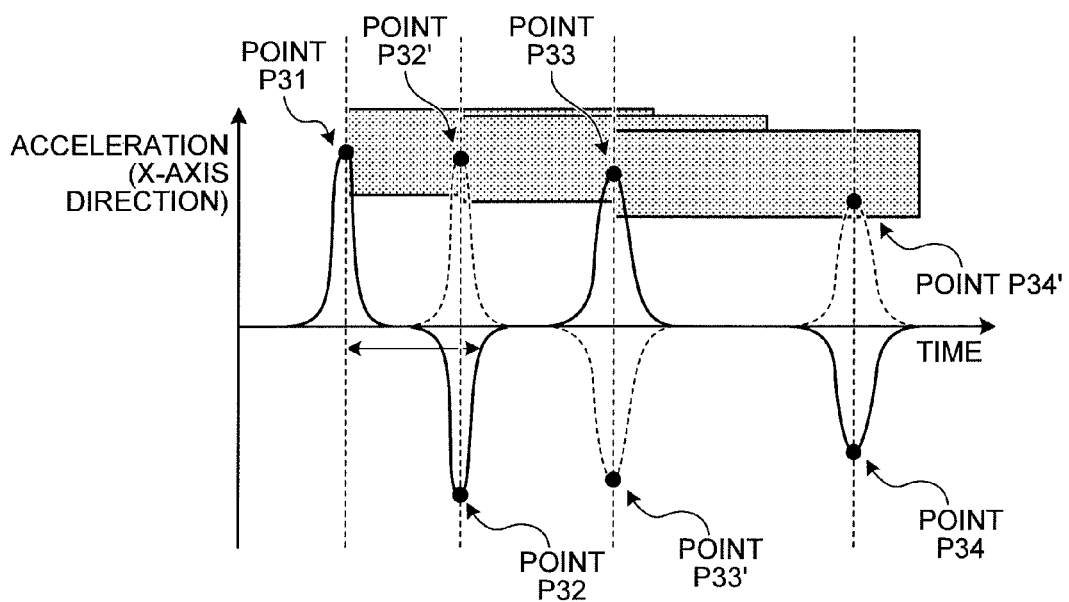
FIG. 25 is a graph illustrating an example of an acceleration applied to the mobile communication apparatus.

Next, the operation of the mobile communication apparatus 50, specifically, a search method of the screening search will be explained with reference to FIG. 23 to FIG. 25. FIG. 23 is a flowchart illustrating an example of the processing operation of the mobile communication apparatus 50, and FIG. 24 and FIG. 25 are explanatory diagrams illustrating an example of acceleration applied to the mobile communication apparatus 50. Hereinafter, a case where the operator moves (shakes) the mobile communication apparatus 50 in the X-axis direction will be explained as an example.

In the present embodiment, in order to discriminate a case of a mere swing of the mobile communication apparatus 50 (for example, a case where the operator is walking with the mobile communication apparatus 50 in his/her pocket) from a case where the operator moves (shakes) the mobile communication apparatus 50, it is determined (A) whether positive and negative between a peak value of the present acceleration and a peak value of the previous acceleration have been reversed, (B) whether a difference between an absolute value of the peak value of the present acceleration and an absolute value of the peak value of the previous acceleration is less than a set value As, and (C) whether a period of time between a time of the peak value of the present acceleration and a time of the peak value of the previous acceleration is less than a set value Ts.

Referring to FIG. 23, the retrieval unit 60 determines whether the peak value of the acceleration (here, acceleration in the X-axis direction) has been detected, at Step S92. That is, the acceleration sensor 54 detects the acceleration and the signal is input to the object operation unit 74 through the input unit 64, and the retrieval unit 60 determines whether the acceleration is the peak value. When it is determined at Step S92 that the acceleration is not the peak value (No), the retrieval unit 60 waits at Step S92 until the acceleration reaches the peak value.

When it is determined at Step S92 that the acceleration is the peak value (Yes), the retrieval unit 60 stores a peak value Ap detected this time and a present time Tp at which the peak value of the acceleration is detected this time in the object information database 78, at Step S94.

Subsequently, the retrieval unit 60 determines whether the process is in screening operation, that is, whether the screening operation flag is ON, at Step S96. At the beginning of the operation by the operator, the screening operation flag is preset to be OFF, and therefore the retrieval unit 60 determines that the screening operation flag is not ON (No), and proceeds the process to Step S98.

When it is determined at Step S96 that the screening operation flag is not ON (No), the retrieval unit 60 performs the initialization process at Step S98. As the initialization process, for example, a process is exemplified in which the screening operation flag being a flag indicating whether the process is in screening operation is set to ON.

The retrieval unit 60 stores the peak value Ap of the present acceleration and the present time Tp in the object information database 78 as a peak value Af of the previous acceleration and a previous time Tf in order to prepare for detection of a peak value of next acceleration, at Step S100. The retrieval unit 60 ends the process, and, thereafter, executes again the flow illustrated in FIG. 23.

When it is determined at Step S96 that the screening operation flag is ON (Yes), the retrieval unit 60 determines, at Step S102, whether the positive and the negative between the peak value Af of the previous acceleration and the peak value Ap of the present acceleration have been reversed, that is, whether $$Ap \times Af < 0 \tag{4}.$$

When it is determined at Step S102 that the positive and the negative between the peak value Af of the previous acceleration and the peak value Ap of the present acceleration have been reversed (Yes), the retrieval unit 60 determines, at Step S104, whether a difference between the present time Tp and the previous time Tf is less than the set value Ts, that is, whether $$Tp - Tf < Ts \tag{5}.$$

When it is determined at Step S104 that the difference between the present time Tp and the previous time Tf is less than the value Ts (Yes), the retrieval unit 60 determines, at Step S106, whether a difference between an absolute value |Ap| of the peak value Ap of the present acceleration and an absolute value |Af| of the peak value Af of the previous acceleration is greater than −As and less than As, that is, whether $$-As < |Ap| - |Af| < As \tag{6}.$$

When it is determined at Step S106 that the difference between the absolute value |Ap| of the peak value Ap of the present acceleration and the absolute value |Af| of the peak value Af of the previous acceleration is greater than −As and less than As (Yes), the retrieval unit 60 performs the screening process, at Step S108. As an example of the screening process, similarly to FIG. 15 and FIG. 16 as previously explained, a case is exemplified where the difference between the present time Tp and the previous time Tf and/or the difference between the absolute value |Ap| of the peak value Ap of the present acceleration and the absolute value |Af| of the peak value Af of the previous acceleration is calculated as a key, an exclusion relevance ratio (threshold) is acquired by referring to a table in which the difference between the present time Tp and the previous time Tf and/or the difference between the absolute value |Ap| of the peak value Ap of the present acceleration and the absolute value |Af| of the peak value Af of the previous acceleration is associated with the exclusion relevance ratio (threshold), and an item object with a relevance ratio equal to or less than the exclusion relevance ratio (threshold) is separated (excluded, not contained, or removed) from (in) the group object. The table may be previously stored in the object information database 78. Thereafter, the retrieval unit 60 proceeds the process to Step S100.

When it is determined at Step S102 that the positive and the negative between the peak value Af of the previous acceleration and the peak value Ap of the present acceleration have not been reversed (No), when it is determined at Step S104 that the difference between the present time Tp and the previous time Tf is not less than the value Ts (No), or when it is determined at Step S106 that the difference between the absolute value |Ap| of the peak value Ap of the present acceleration and the absolute value |Af| of the peak value Af of the previous acceleration is not greater than −As or not less than As (No), the retrieval unit 60 ends the screening operation and turns OFF the screening operation flag, at Step S110. The retrieval unit 60 then creates a new group object including screened-out item objects, at Step S112. Thereafter, the retrieval unit 60 proceeds the process to Step S100.

In the above description, the case where the mobile communication apparatus 50 is moved (shaken) in the X-axis direction and the opposite direction to the X-axis direction has been explained. However, the present embodiment can also be applied to a case where it is moved (shaken) in the Y-axis direction and the opposite direction to the Y-axis direction, a case where it is moved (shaken) in the Z-axis direction and the opposite direction to the Z-axis direction, or to a case where it is moved (shaken) in a combined direction of these directions and an opposite direction thereto.

FIG. 24 illustrates an example of a graph in which the horizontal-axis direction represents time and the vertical-axis direction represents acceleration applied to the mobile communication apparatus 50. Referring to FIG. 24, when the operator moves (shakes) the housing of the mobile communication apparatus 50 like accelerations illustrated by a line of a first example, (A) the positive and the negative between a peak value (negative) of acceleration at a point P22 and a peak value (positive) of acceleration at a point P21 are reversed, (B) a difference between an absolute value of the peak value of the acceleration at the point P22 and an absolute value of the peak value of the acceleration at the point P21 is less than the set value As, and (C) a period of time between a time of the peak value of the acceleration at the point P22 and a time of the peak value of the acceleration at the point P21 is less than the value Ts. Therefore, the mobile communication apparatus 50 performs the screening process when detecting the peak point P22 of the acceleration.

Meanwhile, when the operator moves (shakes) the housing of the mobile communication apparatus 50 like accelerations illustrated by a line of a second example, (A) the positive and the negative between a peak value (negative) of acceleration at a point P24 and the peak value (positive) of the acceleration at the point P21 are reversed, and (C) a period of time between a time of the peak value of the acceleration at the point P24 and the time of the peak value of the acceleration at the point P21 is less than the value Ts, but (B) a difference between an absolute value of the peak value of the acceleration at the point P24 and the absolute value of the peak value of the acceleration at the point P21 is not less than the set value As. Therefore, the mobile communication apparatus 50 does not perform the screening process when detecting the peak point P24 of the acceleration.

FIG. 25 illustrates an example of a graph in which the horizontal-axis direction represents time and the vertical-axis direction represents acceleration applied to the mobile communication apparatus 50. Referring to FIG. 25, the mobile communication apparatus 50 repeatedly performs the processes illustrated in the flowchart of FIG. 23, and therefore, when the operator quickly moves (shakes) the housing of the mobile communication apparatus 50 like accelerations illustrated in FIG. 25 and, thereafter, slowly moves (shakes) the housing, then the mobile communication apparatus 50 performs Step S94 to Step S112 of FIG. 23 each time each of peak points P31 to P34 of accelerations is detected.

In this manner, the mobile communication apparatus 50 separates the item object with the low relevance ratio from the group object based on the degree of movement of the mobile communication apparatus 50, that is, based on the degree of movement of the group object, and the operator can thereby visually recognize the extracted (retrieved) result. This enables the operator to easily obtain his/her desired result of retrieval. In addition, the level of the relevance ratio can be easily adjusted by the operator's operation, thus improving operability for the operator.

As explained above, the same effect as that of the first embodiment can be obtained also in the second embodiment using the acceleration sensor 54.

In the first and the second embodiments, an outer periphery (outline) of a display area of the group object and/or a group of item objects is preferably indicated by a line. By specifying the outer periphery of the display area using the line in this manner, the size of the display area can be accurately recognized, so that the touch operation by the operator can be appropriately performed.

In the first and the second embodiments, the retrieval unit 60 calculates the exclusion relevance ratio (threshold), however, the present invention is not limited thereto. The exclusion relevance ratio has only to be acquired, and therefore information for the exclusion relevance ratio (threshold) supplied from an external device through a network or the like may be used.

In the first and the second embodiments, the image file are used as an example for explanation, however, as explained above, the embodiments can also be used to retrieve a music file, retrieve a home page, and the like. Furthermore, it may be used to retrieve a destination (the other party to be communicated). In this case, the group object functions as so-called address book, and the item object functions as an individual address (destination specified object). The individual address stores therein information such as name, telephone number, mail address, and address. In addition, it may be configured to move the state to a mode in which a phone call is made to the individual address extracted as a result of retrieval using the address book, or to move to a mail composition screen on which mail to be sent to the extracted individual address is created. In this case, the communication unit 26 performs communication with a specified destination based on the information stored in at least one individual address selected from among the extracted individual addresses through the operation by the operator to the input device, thus sending mail and making a phone call.

In the first and the second embodiments, the mobile phone with a touch panel is uses as an example for explanation of a preferred embodiment, however, the present invention is not limited thereto. As explained above, the embodiments can be used for various communication devices. As the communication unit, a communication unit for connecting to a public telecommunication network via a base station and a communication unit for directly communicating with other terminals are exemplified. As a destination, a server, other terminals, and the like are exemplified.

INDUSTRIAL APPLICABILITY

As explained above, the data retrieval apparatus and the data retrieval method according to the present invention are useful to extract an object that meets search criteria from among a plurality of objects.

The invention claimed is:

1. A data retrieval apparatus comprising:
a display unit for displaying a group including a plurality of data on a display screen, each of data being associated with a relevance ratio to search criteria;
a detector for detecting movement of the group on the display screen; and a control unit for calculating a rate according to a degree of the movement of the group detected by the detector and for extracting the data from the group based on a comparison between the calculated rate and the relevance ratio of each of the data in the group, wherein the control unit is configured to display the group within an area on the display screen and to move, when the extraction is performed, un-extracted data outside the area, and wherein the un-extracted data are separated from the group after the movement.

2. The data retrieval apparatus according to claim 1, wherein the detector is a touch panel for detecting an operation to drag the group on the display screen, and the control unit is configured to calculate the rate according to the degree of the movement of the dragged group.

3. The data retrieval apparatus according to claim 1, wherein the control unit is configured to determine a range of the rate based on the degree of movement of the group, and to extract data associated with the relevance ratio which is within the range.

4. The data retrieval apparatus according to claim 1, wherein, the control unit is configured to extract the data associated with the higher relevance ratio when the higher degree of the movement of the group is detected by the detector.

5. The data retrieval apparatus according to claim 1, wherein the control unit is configured to display a new group including the data moved to outside of the area.

6. The data retrieval apparatus according to claim 1, wherein the control unit is configured to determine whether the extraction is performed or not, based on a display trajectory of the group according to the movement of the group detected by the detector.

7. The data retrieval apparatus according to claim 6, wherein the control unit is configured to determine that the extraction is performed when a distance between a start position of the group and a reverse position is less than a predetermined value.

8. The data retrieval apparatus according to claim 1, wherein the control unit is configured to calculate the rate according to a moving speed or a moving distance of the movement of the group detected by the detector.

9. A data retrieval method comprising:

displaying a group including a plurality of data on a display screen, each of data being associated with a relevance ratio to search criteria;

detecting movement of the displayed group on the display screen;

calculating a rate according to a degree of the movement of the group; and extracting the data from the group based on a comparison between the calculated rate and the relevance ratio of each of the data in the group, wherein the displaying of the group is within an area on the display screen, data which is not extracted in the extracting step is moved outside of the area when the extraction is performed, and the data which is not extracted is separated from the group after the movement.

\* \* \* \* \*